United States Patent
Baur et al.

(10) Patent No.: US 7,980,221 B2
(45) Date of Patent: Jul. 19, 2011

(54) INVERSE TORQUE MODEL SOLUTION AND BOUNDING

(75) Inventors: Andrew W. Baur, Waterford, MI (US); Jeffrey M. Kaiser, Highland, MI (US); Michael Livshiz, Ann Arbor, MI (US); Christopher E. Whitney, Highland, MI (US); Sharon L. Storch, Brighton, MI (US); Bahram Younessi, Farmington, MI (US); Klaus Pochner, Russeisheim (DE)

(73) Assignee: GM Global Technology Operations LLC

( * ) Notice: Subject to any disclaimer, the term of this patent is extended or adjusted under 35 U.S.C. 154(b) by 435 days.

(21) Appl. No.: 12/259,695

(22) Filed: Oct. 28, 2008

(65) Prior Publication Data
US 2009/0118972 A1 May 7, 2009

Related U.S. Application Data

(60) Provisional application No. 60/985,470, filed on Nov. 5, 2007.

(51) Int. Cl.
*F02M 7/00* (2006.01)
(52) U.S. Cl. ........... 123/435; 123/406.23; 701/103; 701/114

(58) Field of Classification Search .......... 123/350, 123/339.11, 434, 435, 406.11, 406.23; 701/103, 701/104, 114, 115
See application file for complete search history.

(56) References Cited

U.S. PATENT DOCUMENTS

| 5,253,623 | A | * | 10/1993 | Melnyk et al. | 123/339.11 |
| 6,704,638 | B2 | | 3/2004 | Livshiz et al. | |
| 7,463,970 | B2 | * | 12/2008 | Livshiz et al. | 701/114 |
| 7,606,652 | B2 | * | 10/2009 | Kaiser et al. | 701/102 |
| 7,748,362 | B2 | * | 7/2010 | Whitney et al. | 123/406.23 |
| 2007/0156325 | A1 | * | 7/2007 | Livshiz et al. | 701/123 |

OTHER PUBLICATIONS

U.S. Appl. No. 11/685,735, filed Mar. 13, 2007, Livshiz.

\* cited by examiner

*Primary Examiner* — John T Kwon

(57) ABSTRACT

An engine control system includes a spark bound module that determines a bounded spark value based on a desired spark value, a torque bound module that determines a bounded torque value based on the bounded spark value and a desired torque value, and an inverse torque calculation module that determines a desired engine air value based on the bounded torque value and the square of the bounded spark value. The engine air value may be one of a desired air-per-cylinder value and a desired manifold air pressure value. The bounded spark value and the bounded torque value are determined based on one or more of a plurality of engine actuator positions. Related methods for determining the bounded spark value, the bounded torque value, and the engine air value are also provided.

23 Claims, 28 Drawing Sheets

INVERSE TORQUE MODEL SOLUTION AND BOUNDING

CROSS-REFERENCE TO RELATED APPLICATIONS

This application claims the benefit of U.S. Provisional Application No. 60/985,470, filed on Nov. 5, 2007. The disclosure of the above application is incorporated herein by reference.

FIELD

The present disclosure relates to control of internal combustion engines and, more particularly, to control systems and methods for estimating a desired engine air value for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts a throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

This section provides a general summary of the disclosure, and is not a comprehensive disclosure of its full scope or all of its features.

In one form, the present disclosure provides an engine control system comprising a spark module that determines a bounded spark value based on a desired spark value, a torque module that determines a bounded torque value based on the bounded spark value and a desired torque value, and an inverse torque calculation module that determines a desired engine air value based on the bounded torque value and the square of the bounded spark value. The engine air value may be one of a desired APC and a desired MAP. The bounded spark value and the bounded torque values may be determined based on one or more of a plurality of engine actuator positions.

In an exemplary implementation, the present disclosure provides the inverse torque calculation module may determine the desired engine air value using a second order torque model defined as: $T = K_{A2}*A^2 + K_A*A + K_{AS}*A*S + K_{AS2}*A*S^2 + K_S*S + K_{S2}*S^2 + K_R$, wherein A is equal to the engine air value; S is equal to the bounded spark value, T is equal to the bounded torque value, and $K_{A2}$, $K_A$, $K_{AS}$, $K_{AS2}$, $K_S$, $K_{S2}$, and $K_R$ are predetermined torque sensitivity constants that are based on a plurality of engine actuator positions. In a related feature, the present disclosure provides the bounded spark value may be determined based on a number of spark poles, the number of spark poles being determined based on the torque sensitivity constants.

The bounded torque value may be determined based on the bounded spark value and the torque sensitivity constant $K_{A2}$. The engine air value may be MAP and the torque sensitivity constant $K_{A2}$ may be equal to zero. The torque sensitivity constant $K_A$ may be greater than zero. The plurality of desired engine actuator positions may include one or more of intake and exhaust cam phaser angles, an air/fuel ratio, an oil temperature, a number of cylinders currently being fueled, a dual pulse mode, and an ethanol equivalence mode.

In further features, the engine control system can further comprise an inverse MAP module that determines a desired MAP value based on the bounded torque value and the square of the bounded spark value, wherein the inverse torque calculation module determines a desired APC value.

In still other features, the engine control system can further comprise a torque estimation module that determines an estimated engine torque value based on an actual air value and the desired spark using the second order torque model.

In another form, the present disclosure provides a method for determining an engine air value comprising determining a bounded spark value based on a desired spark value, determining a bounded torque value based on the bounded spark value, and determining the engine air value based on the bounded torque value and the square of the bounded spark value.

BRIEF DESCRIPTION OF THE DRAWINGS

The drawings described herein are for illustrative purposes only of selected embodiments and not all possible implementations, and are not intended to limit the scope of the present disclosure. The present disclosure will become more fully understood from the detailed description and the accompanying drawings, wherein.

Corresponding reference numerals indicate corresponding parts throughout the several views of the drawings.

DETAILED DESCRIPTION

Figure 1:
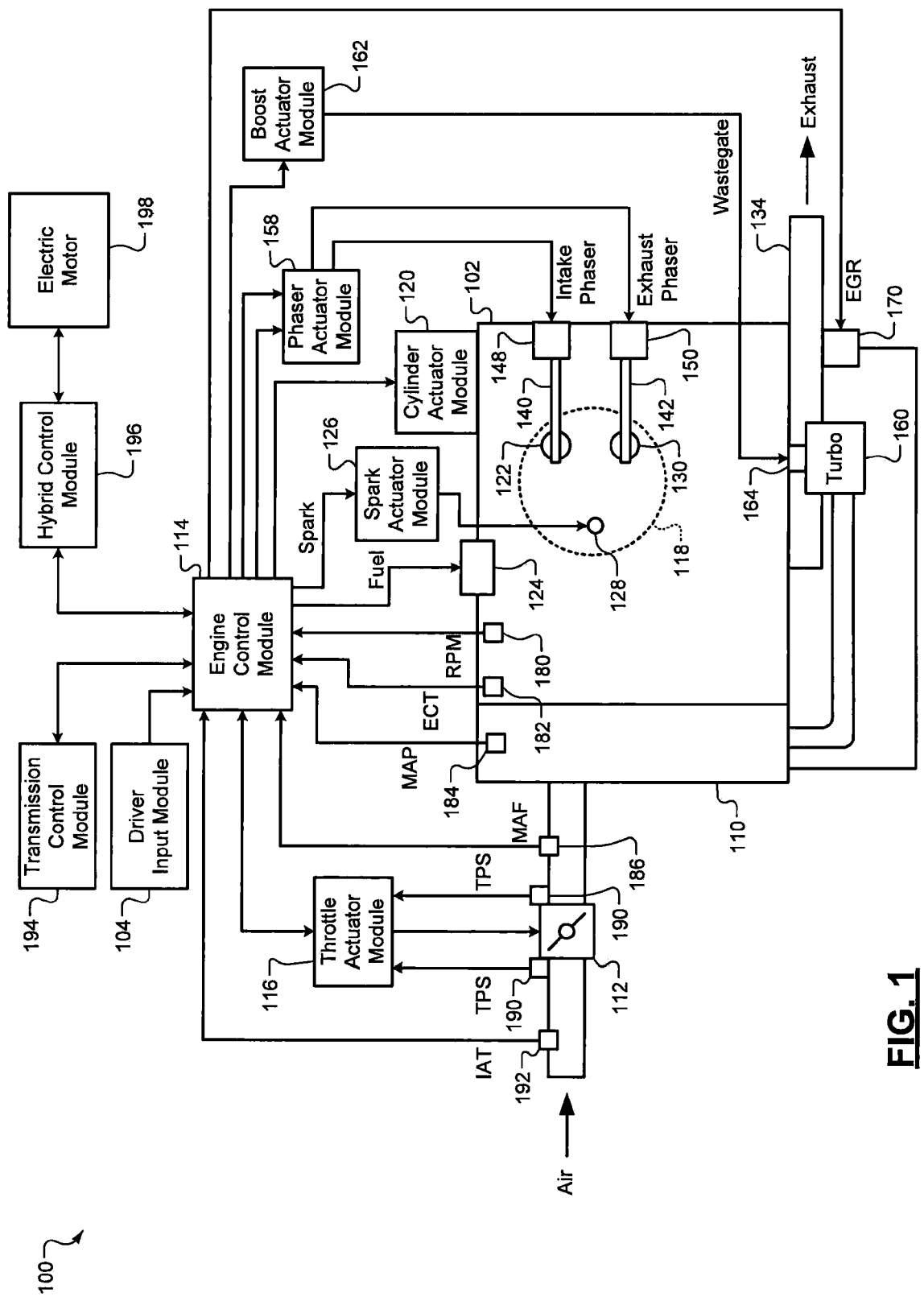
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is shown. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders (i.e. two or more), for illustration purposes, a single representative cylinder 118 is shown. The ECM 114 may instruct a cylinder actuator module 120 to selectively deactivate some of the cylinders to improve fuel economy. As used herein, the term deactivate means to inhibit combustion, usually by inhibiting fuel distribution and spark to a desired cylinder.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each cylinder 118. Alternatively, the fuel injection system 124 may inject fuel directly into the cylinder 118.

The injected fuel mixes with the air and creates the air/fuel mixture in the cylinder 118. A piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), and the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by inhibiting fuel and spark to the cylinders and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals received from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be drawn from the intake manifold 110.

Figure 2:
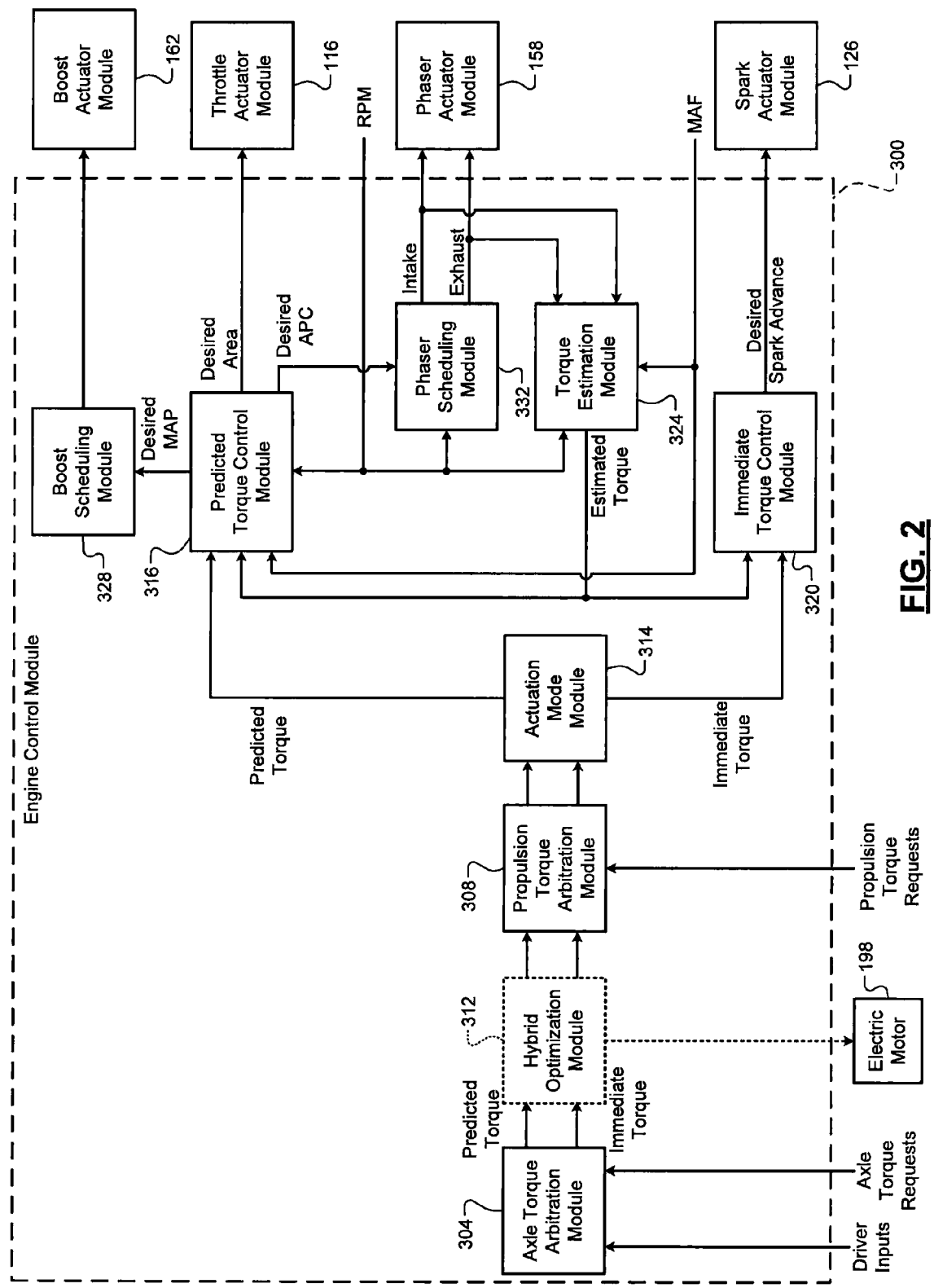
FIG. 2 is a functional block diagram of an exemplary engine control system according to the principles of the present disclosure.

A wastegate 164 may allow exhaust gas to bypass the turbocharger 160, thereby reducing the turbocharger's output (or boost). The ECM 114 controls the turbocharger 160 via a boost actuator module 162 (FIG. 2). The boost actuator module 162 may modulate the boost of the turbocharger 160 by controlling the position of the wastegate 164. The compressed air charge is provided to the intake manifold 110 by the turbocharger 160.

An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the various sensors discussed herein to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, transmission control module 194, and hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position or actuator value.

Similarly, the spark actuator module 126 can be referred to as an actuator, while the corresponding actuator position may be the amount of spark advance. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When an engine transitions from producing one torque to producing another torque, many actuator positions will change to produce the new torque most efficiently. For example, spark advance, throttle position, exhaust gas recirculation (EGR) regulation, and cam phaser angles may change. Changing one of these actuator positions often creates engine conditions that would benefit from changes to other actuator positions, which might then result in changes to the original actuators. This feedback results in iteratively updating actuator positions until they are all positioned to produce a desired torque most efficiently.

Referring now to FIG. 2, a functional block diagram of an exemplary engine control system is shown. An engine control module (ECM) 300 includes an axle torque arbitration module 304. The axle torque arbitration module 304 arbitrates between driver inputs from the driver input module 104 and other axle torque requests. For example, driver inputs may include accelerator pedal position. Other axle torque requests may include torque reduction requested during a gear shift by the transmission control module 194, torque reduction requested during wheel slip by a traction control system, and torque requests to control speed from a cruise control system.

The axle torque arbitration module 304 outputs a predicted torque and an immediate torque. The predicted torque is the amount of torque that will be required in the future to meet the driver's torque and/or speed requests. The immediate torque is the torque required at the present moment to meet temporary torque requests, such as torque reductions when shifting gears or when traction control senses wheel slippage.

The immediate torque may be achieved by engine actuators that respond quickly, while slower engine actuators are targeted to achieve the predicted torque. For example, a spark actuator may be able to quickly change spark advance, while cam phaser or throttle actuators may be slower to respond. The axle torque arbitration module 304 outputs the predicted torque and the immediate torque to a propulsion torque arbitration module 308.

In various implementations, the axle torque arbitration module 304 may output the predicted torque and immediate torque to a hybrid optimization module 312. The hybrid optimization module 312 determines how much torque should be produced by the engine and how much torque should be produced by the electric motor 198. The hybrid optimization module 312 then outputs modified predicted and immediate torque values to the propulsion torque arbitration module 308. In various implementations, the hybrid optimization module 312 may be implemented in the hybrid control module 196.

The propulsion torque arbitration module 308 arbitrates between the predicted and immediate torque and propulsion torque requests. Propulsion torque requests may include torque reductions for engine over-speed protection and torque increases for stall prevention.

An actuation mode module 314 receives the predicted torque and the immediate torque from the propulsion torque arbitration module 308. Based on a mode setting, the actuation mode module 314 determines how the predicted and immediate torques will be achieved. For example, in a first mode of operation, the actuation mode module 314 may output the predicted torque to a predicted torque control module 316. The predicted torque control module 316 converts the predicted torque to desired engine parameters, such as desired manifold absolute pressure (MAP), desired throttle area, and/or desired air per cylinder (APC).

In the first mode of operation, the actuation mode module 314 may instruct an immediate torque control module 320 to set desired engine parameters to achieve the maximum possible torque. The immediate torque control module 320 may control engine parameters that change relatively more quickly than the engine parameters controlled by the predicted torque control module 316. For example, the immediate torque control module 320 may control spark advance, which may reach a commanded value by the time the next cylinder fires. In the first mode of operation, the immediate torque request is ignored by the predicted torque control module 316 and by the immediate torque control module 320.

In a second mode of operation, the actuation mode module 314 may output the predicted torque to the predicted torque control module 316. The actuation mode module 314 may instruct the immediate torque control module 320 to attempt to achieve the immediate torque, such as by retarding the spark.

In a third mode of operation, the actuation mode module 314 may instruct the cylinder actuator module 120 to deactivate cylinders if necessary to achieve the immediate torque request. In this mode of operation, the predicted torque is output to the predicted torque control module 316 and the immediate torque is output to the immediate torque control module 320.

In a fourth mode of operation, the actuation mode module 314 outputs a reduced torque to the predicted torque control module 316. The predicted torque may be reduced only so far as is necessary to allow the immediate torque control module 320 to achieve the immediate torque request using spark retard.

The immediate torque control module 320 receives an estimated torque from a torque estimation module 324. The immediate torque control module 320 may set spark advance using the spark actuator module 126 to achieve the desired immediate torque. The estimated torque may be defined as the amount of torque that could immediately be produced by setting the spark advance to a calibrated value. This value may be calibrated to be the minimum spark advance that achieves the greatest torque for a given RPM and air per cylinder. The immediate torque control module 320 can then select a smaller spark advance that reduces the estimated torque to the immediate torque.

The predicted torque control module 316 also receives the estimated torque and may receive a measured mass air flow (MAF) signal and an engine revolutions-per-minute (RPM) signal. The predicted torque control module 316 generates a desired manifold absolute pressure (MAP) signal, which is output to a boost scheduling module 328.

The boost scheduling module 328 uses the desired MAP signal to control the boost actuator module 162. The boost actuator module 162 then controls a turbocharger, such as turbocharger 160, or a supercharger. The predicted torque control module 316 generates a desired area signal, which is output to the throttle actuator module 116. The throttle actuator module 116 then regulates the throttle valve 112 to produce the desired throttle area.

The predicted torque control module 316 generates a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 may use current intake and exhaust cam phaser angles along with the MAF signal to determine the estimated torque. The current intake and exhaust cam phaser angles may be measured values. Further discussion of torque estimation can be found in commonly assigned U.S. Pat. No. 6,704,638 entitled "Torque Estimator for Engine RPM and Torque Control," the disclosure of which is incorporated herein by reference in its entirety.

Figure 3:
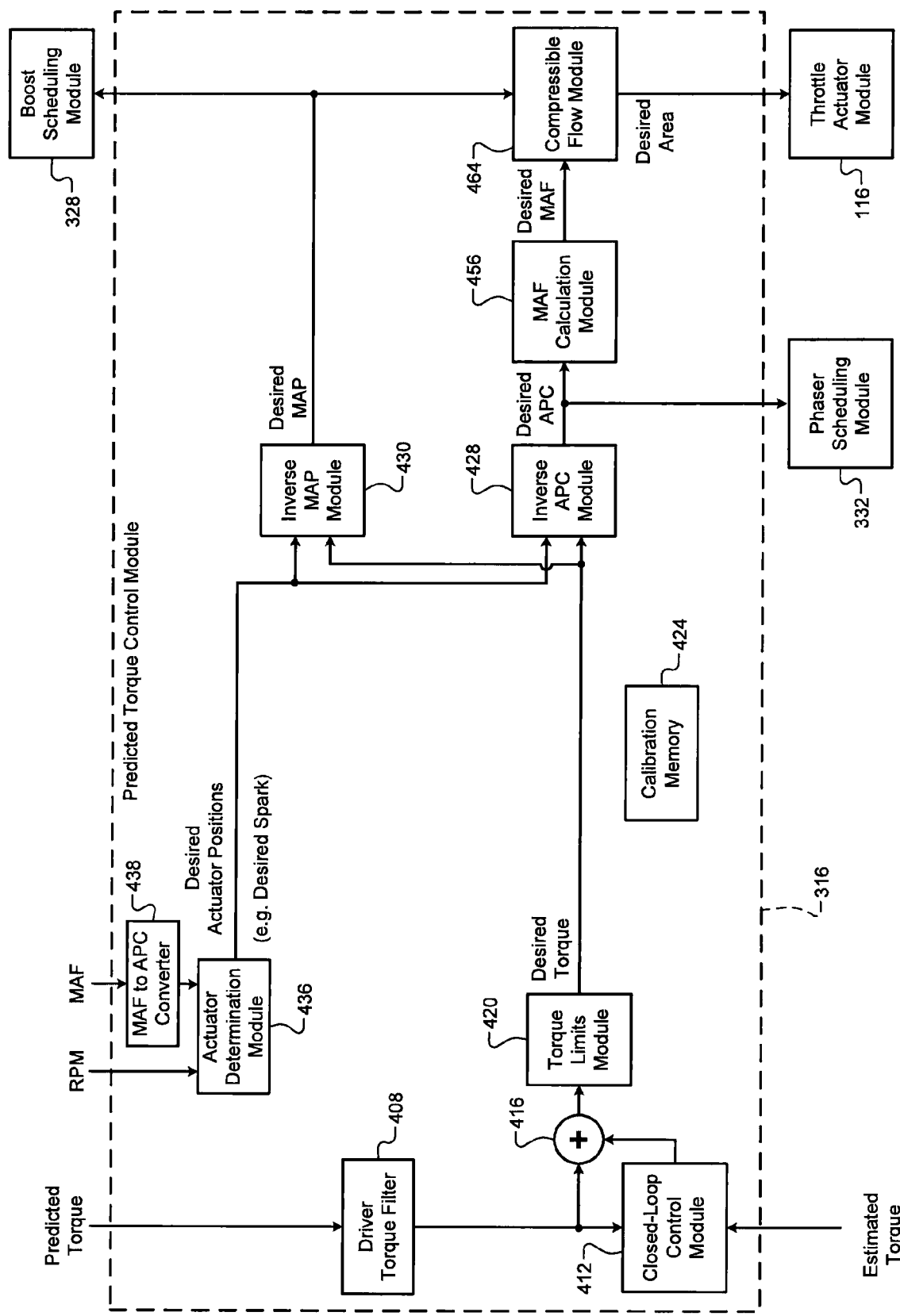
FIG. 3 is a functional block diagram of an exemplary implementation of the predicted torque control module shown in FIG. 2 according to the principles of the present disclosure.

Referring now to FIG. 3, a functional block diagram of an exemplary implementation of the predicted torque control module 316 is shown. The predicted torque control module 316 implements an inverse second-order torque model according to the principles of the present disclosure. The predicted torque control module 316 uses equations derived from the model to calculate one or more engine air values (e.g., APC, MAP) based on a desired torque. The equations are developed from the model by applying boundary conditions that ensure rational solutions. By using the equations developed from the model, the predicted torque control module 316 is able to determine the engine air values more accurately and efficiently. The predicted torque control module 316 is able to determine the engine air values more accurately using less memory.

A driver torque filter 408 receives a torque request from the actuation mode module 314. The driver torque filter 408 may receive signals from the axle torque arbitration module 304 and/or the propulsion torque arbitration module 308 indicating whether the currently commanded torque is a result of driver input. If so, the driver torque filter 408 may filter out high frequency torque changes, such as may be caused by the driver's foot modulating the accelerator pedal while on rough road.

The driver torque filter 408 outputs a desired torque ($T_{des}$) to a closed-loop control module 412 and a summation module 416. The closed-loop control module 412 receives the estimated torque from the torque estimation module 324. The closed-loop control module 412 compares the estimated torque to the desired torque and outputs a correction factor to the summation module 416. The summation module 416 adds the desired torque from the driver torque filter 408 with the correction factor from the closed-loop control module 412.

In various implementations, the closed-loop control module 412 may simply output a correction factor equal to the difference between the desired torque and the estimated torque. Alternatively, the closed-loop control module 412 may use a proportional-integral (PI) control scheme to meet the desired torque from the driver torque filter 408. The torque correction factor may include a proportional offset based on the difference between the desired torque and the estimated torque. The torque correction factor may also include an offset based on an integral of the difference between the desired torque and the estimated torque. The torque correction factor $T_{pi}$, which is output to the summation module 416, may be determined by the following equation:

$$T_{pi}=K_p*(T_{des}-T_{est})+K_i*\int(T_{des}-T_{est})\partial t, \text{ where} \quad (1)$$

$K_p$ is a pre-determined proportional constant and $K_i$ is a pre-determined integral constant.

Further discussion of PI control can be found in commonly assigned patent application Ser. No. 11/656,929, filed Jan. 23, 2007, and entitled "Engine Torque Control at High Pressure Ratio," the disclosure of which is incorporated herein by reference in its entirety. Additional discussion regarding PI control of engine speed can be found in commonly assigned patent application Ser. No. 11/685,735, filed Mar. 13, 2007, and entitled "Torque Based Engine Speed Control," the disclosure of which is incorporated herein by reference in its entirety.

An output of the summation module 416 is received by a torque limits module 420. The torque limits module 420 may apply limits to the desired torque. For example, an upper limit may be applied that protects against torque requests that would damage the engine. The torque limits module 420 may also apply a lower limit to prevent stalling the engine 102.

The lower and upper limits may be determined from memory, such as a calibration memory 424, and may be based on RPM. The torque limits module 420 outputs the desired torque, as limited, to an inverse APC module 428 and an inverse MAP module 430.

An actuator determination module 436 receives an RPM signal and a measured APC signal. The measured APC signal may be received from a MAF to APC converter 438 that converts a measured MAF into a measured APC ($APC_{meas}$). The actuator determination module 436 determines desired actuator positions, such as intake and exhaust cam phaser angles, spark advance, and air/fuel ratio. The intake and exhaust cam phaser angles and spark advance may be functions of RPM and APC, while the air/fuel ratio may be a function of APC. The actuator determination module 436 outputs the desired actuator positions to the inverse APC module 428 and the inverse MAP module 430.

The inverse APC module 428 determines a desired APC ($APC_{des}$) based the desired torque received from the torque limits module 420 and the desired actuator positions received from the actuator determination module 436. The inverse APC module 428 may implement an inverse torque model that determines the desired APC based on desired actuator positions such as spark advance (S), intake (I) and exhaust (E) cam phaser angles, air/fuel ratio (AF), oil temperature (OT), and number of cylinders currently being fueled (#). For purposes of this disclosure, the inverse APC module 428 determines desired APC using an inverse torque model that may be represented by the following general equation:

$$APC_{des} = T_{apc}^{-1}(T_{des}, S, I, E, AF, OT, \#) \quad (2)$$

Specifically, the inverse APC module 428 can determine the desired APC using the following seven-term second-order torque model:

$$T = K_{A2}*A^2 + K_A*A + K_{AS}*A*S + K_{AS2}*A*S^2 + K_S*S + K_{S2}*S^2 + K_R \quad (3)$$

where T is a torque value, A is an APC value, S is a spark value, and $K_{A2}$, $K_A$, $K_{AS}$, $K_{AS2}$, $K_S$, $K_{S2}$, and $K_R$ are APC torque sensitivity constants (APC k-values). The APC torque sensitivity constants may be predetermined values that can be based on actuator positions such as, but not limited to, spark advance (S), intake (I) and exhaust (E) cam phaser angles, air/fuel ratio (AF), oil temperature (OT), the number of cylinders currently being fueled (#), dual pulse mode, and ethanol equivalence mode. The APC torque sensitivity constants may be determined by empirical methods by quasi-steady-state engine testing in which the engine actuator positions are varied and the resulting APC is measured. The values for each particular APC torque sensitivity constant may vary based on the various combinations of actuator positions. Additionally, the APC k-values may be positive, negative or zero. The APC k-values may be scaled in order to ensure unit balance in equation (4) and produce a particular range of desired APC values. The APC k-values may be stored in memory tables in the calibration memory 424 and looked up based on the desired actuator positions for use in the foregoing inverse torque model.

The terms of equation (3) can be rearranged, yielding the following inverse torque model equation:

$$(K_{A2})*A^2 + (K_{AS2}*S^2 + K_{AS}*S + K_A)*A + (K_S*S + K_{S2}*S^2 + K_R - T) = 0 \quad (4)$$

Equation (4) has the form of a quadratic equation and therefore, A can be determined using the following quadratic formula:

$$A = \frac{-b_2 \pm \sqrt{b_2^2 - 4*a*c}}{2*a}, \quad (5)$$

where $A = APC_{des}$ $a = K_{A2}$ $b = K_{AS2}*S^2 + K_{AS}*S + K_A$ $c = K_S*S + K_{S2}*S^2 + K_R - T$ It should be noted that since it may be desired to limit desired APC to positive values, the negative radical term in the foregoing quadratic term may be ignored. Thus, the inverse APC module 428 can determine the desired APC based on the desired torque and the desired actuator positions by implementing the inverse torque model described in equation (4) and using equation (5). Exemplary steps followed by the inverse APC module 428 to determine the desired APC are described in more detail below with reference to FIGS. 7-9.

The inverse APC module 428 outputs the desired APC to a MAF calculation module 456 and the phaser scheduling module 332.

The inverse MAP module 430 determines a desired MAP ($MAP_{des}$) based on the desired torque received from the torque limits module 420 and the desired actuator positions received from the actuator determination module 436. The inverse MAP module 430 determines the desired MAP using a second-order torque model substantially similar to the model described in equation (3). Specifically, the inverse MAP module 430 determines the desired MAP using the following equations:

$$T = K'_{A2}*A'^2 + K'_A*A' + K'_{AS}*A'*S + K'_{AS2}*A'*S^2 + K'_S*S + K'_{S2}*S^2 + K'_R \quad (6)$$

$$(K'_{A2})*A'^2 + \left(\begin{array}{c} K'_{AS2}*S^2 + \\ K'_{AS}*S + K'_A \end{array}\right)*A' + \left(\begin{array}{c} K'_S*S + K'_{S2}* \\ S^2 + K'_R - T \end{array}\right) = 0 \quad (7)$$

$$A' = \frac{-b'_2 \pm \sqrt{b'^2_2 - 4*a'*c'}}{2*a'}, \quad (8)$$

where $A' = MAP_{des}$ $a' = K'_{A2}$ $b' = K'_{AS2}*S^2 + K'_{AS}*S + K'_A$ $c' = K'_S*S + K'_{S2}*S^2 + K'_R - T$ In the foregoing equations, $K'_{A2}$, $K'_A$, $K'_{AS}$, $K'_{AS2}$, $K'_S$, $K'_{S2}$, and $K'_R$ are MAP torque sensitivity constants (MAP k'-values). The MAP torque sensitivity constants may be predetermined values that can be based on actuator positions such as, but not limited to, spark advance (S), intake (I) and exhaust (E) cam phaser angles, air/fuel ratio (AF), oil temperature (OT), the number of cylinders currently being fueled (#), dual pulse mode, and ethanol equivalence mode. Like the APC torque sensitivity constants previously discussed, the MAP torque sensitivity constants may also be determined by empirical methods by conducting quasi-steady-state engine testing in which the engine actuator positions are varied and the resulting MAP is measured.

The values for each particular MAP torque sensitivity constant may vary based on the various combinations of actuator positions. Additionally, the MAP k'-values may be positive, negative or zero. For purposes of the present disclosure, the value of $K'_{A2}$ is zero. The MAP torque sensitivity values may be scaled in order to ensure unit balance in equation (7) and produce a particular range of desired MAP values. The MAP torque sensitivity constants can be stored in the calibration memory 424 and looked up based on the desired actuator positions for use in the foregoing inverse torque model.

Thus, the inverse MAP module 430 can determine the desired MAP based on the desired torque and the desired actuator positions by implementing the inverse torque model in equation (7) and using equation (8). The particular steps followed by the inverse MAP module 430 to determine the desired MAP is described in more detail below with reference to FIGS. 7-9. The inverse MAP module 430 outputs the desired MAP to a compressible flow module 464 and the boost scheduling module 328.

Figure 4:
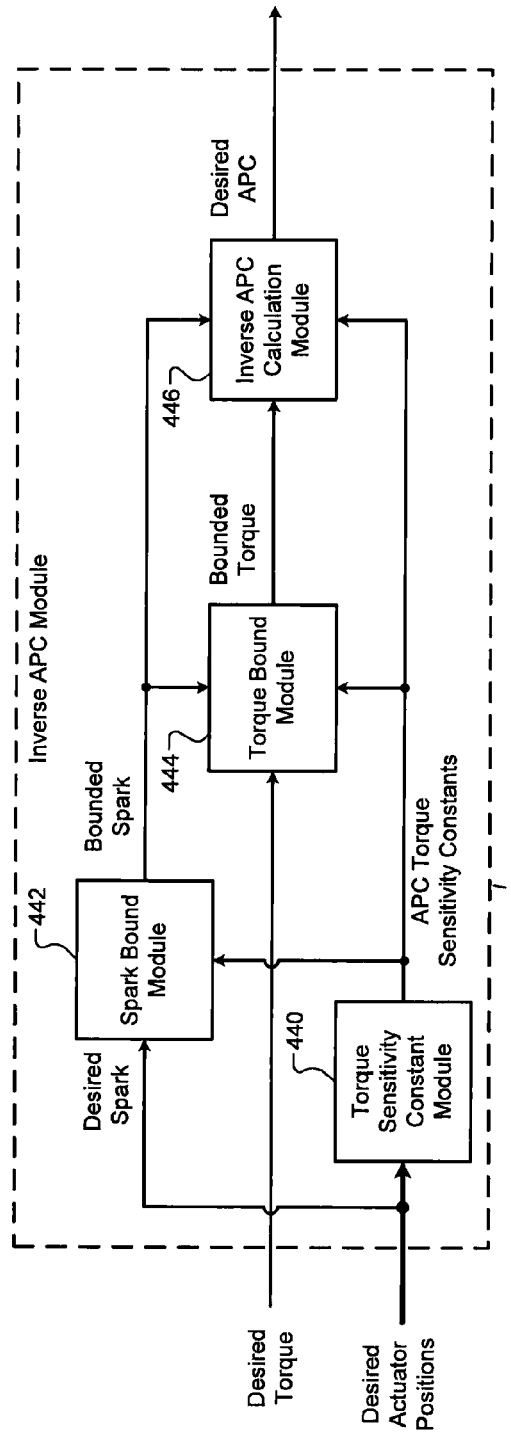
FIG. 4 is a functional block diagram of an exemplary implementation of the inverse APC module shown in FIG. 3 according to the principles of the present disclosure.

Referring now to FIG. 4, a functional block diagram of an exemplary implementation of the inverse APC module 428 is shown. A torque sensitivity constant module 440 receives the desired actuator positions from the actuator determination module 436. Using the desired actuator positions, the torque sensitivity constant module 440 retrieves (i.e. looks up) the corresponding APC torque sensitivity constants (i.e. $K_{A2}$, $K_A$, $K_{AS}$, $K_{AS2}$, $K_S$, $K_{S2}$, and $K_R$) from the calibration memory 424. The torque sensitivity constant module 440 outputs the APC torque sensitivity constants to a spark bound module 442, a torque bound module 444, and an inverse APC calculation module 446.

The spark bound module 442 receives the desired spark ($S_{des}$) from the actuator determination module 436 and the APC torque sensitivity constants from the torque sensitivity constant module 440. The spark bound module 442 determines a bounded spark value ($S_{bound}$) based on the desired spark ($S_{des}$) and the APC torque sensitivity constants. The spark bound module 442 outputs the bounded spark value to the torque bound module 444 and the inverse APC calculation module 446.

The torque bound module 444 receives the bounded spark value from the spark bound module 442, the APC sensitivity constants from the torque sensitivity constant module 440, and the desired torque ($T_{des}$) from the torque limits module 420. Based on the bounded spark value, the APC torque sensitivity constants, and the desired torque, the torque bound module 444 determines a bounded torque value ($T_{bound}$). The torque bound module 444 outputs the bounded torque value to the inverse APC calculation module 446.

The inverse APC calculation module 446 receives the bounded spark value ($S_{bound}$) from the spark bound module 442, the bounded torque value ($T_{bound}$) from the torque bound module 444, and the APC torque sensitivity constants (APC k-values) from the torque sensitivity constant module 440. The inverse APC calculation module 446 determines a desired APC ($APC_{des}$) based on the bounded spark value, the bounded torque value, and the APC torque sensitivity constants. The inverse APC calculation module 446 outputs the desired APC to the MAF calculation module 456.

Figure 5:
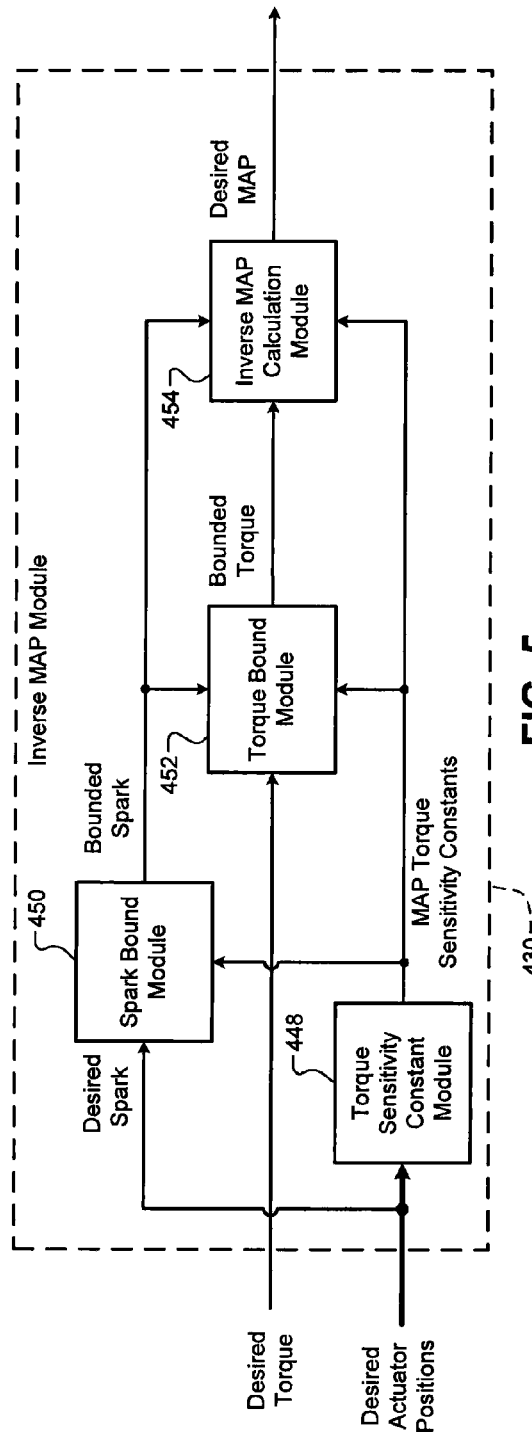
FIG. 5 is a functional block diagram of an exemplary implementation of the inverse MAP module shown in FIG. 3 according to the principles of the present disclosure.

Referring now to FIG. 5, a functional block diagram of an exemplary implementation of the inverse MAP module 430 is shown. A torque sensitivity constant module 448 receives the desired actuator positions from the actuator determination module 436. Using the desired actuator positions, the torque sensitivity constant module 448 retrieves the corresponding MAP torque sensitivity constants (i.e. $K'_{A2}$, $K'_A$, $K'_{AS}$, $K'_{AS2}$, $K'_S$, $K'_{S2}$, and $K'_R$) from the calibration memory 424. The torque sensitivity constant module 448 outputs the MAP torque sensitivity constants to a spark bound module 450, a torque bound module 452, and an inverse MAP calculation module 454.

The spark bound module 450 receives the desired spark ($S_{des}$) from the actuator determination module 436 and the MAP torque sensitivity constants (MAP k'-values) from the torque sensitivity constant module 448. The spark bound module 450 determines a bounded spark value ($S'_{bound}$) based on the desired spark and the MAP torque sensitivity constants. The spark bound module 450 outputs the bounded spark value to the torque bound module 452 and the inverse MAP calculation module 446.

The torque bound module 452 receives the bounded spark value ($S'_{bound}$) from the spark bound module 450, the MAP torque sensitivity constants (MAP k'-values) from the torque sensitivity constant module 448, and the desired torque ($T_{des}$) from the torque limits module 420. Based on the bounded spark value, the MAP torque sensitivity constants, and the desired torque, the torque bound module 452 determines a bounded torque value ($T'_{bound}$). The torque bound module 452 outputs the bounded torque value to the inverse MAP calculation module 454.

The inverse MAP calculation module 454 receives the bounded spark value ($S'_{bound}$) from the spark bound module 450, the bounded torque value ($T'_{bound}$) from the torque bound module 452, and the MAP torque sensitivity constants (MAP k'-values) from the torque sensitivity constant module 448 and determines a desired MAP ($MAP_{des}$) based on the bounded spark value, the bounded torque value, and the MAP torque sensitivity constants. The inverse MAP calculation module 454 outputs the desired MAP to the boost scheduling module 328 and the compressible flow module 464.

Referring again to FIG. 3, the MAF calculation module 456 determines a desired MAF ($MAF_{des}$) based on the desired APC ($APC_{des}$). The desired MAF may be calculated using the following equation:

$$MAF_{des} = \frac{APC_{des} \cdot RPM \cdot \#}{60 \text{ s/min} \cdot 2 \text{ rev/firing}}, \qquad (9)$$

where # is the number of cylinders currently being fueled. The desired MAF is output to the compressible flow module 464.

The compressible flow module 464 determines a desired throttle area ($Area_{des}$) based on the desired MAP and the desired MAF. The desired area may be calculated using the following equation:

$$Area_{des} = \frac{MAF_{des} \cdot \sqrt{R_{gas} \cdot T}}{P_{baro} \cdot \Phi(P_r)}, \qquad (10)$$

where $P_r = \frac{MAP_{des}}{P_{baro}}$, and where $R_{gas}$ is the ideal gas constant, T is intake air temperature, and $P_{baro}$ is barometric pressure. $P_{baro}$ may be directly measured using a sensor, such as the IAT sensor 192, or may be calculated using other measured or estimated parameters.

The $\Phi$ function may account for changes in airflow due to pressure differences on either side of the throttle valve 112. The $\Phi$ function may be specified as follows:

$$\Phi(P_r) = \begin{cases} \sqrt{\frac{2\gamma}{\gamma-1}\left(1 - P_r^{\frac{\gamma-1}{\gamma}}\right)} & \text{if } P_r > P_{critical} \\ \sqrt{\gamma\left(\frac{2}{\gamma+1}\right)^{\frac{\gamma+1}{\gamma-1}}} & \text{if } P_r \leq P_{critical}, \end{cases} \qquad (11)$$

where $$P_{critical} = \left(\frac{2}{\gamma+1}\right)^{\frac{\gamma}{\gamma-1}} = 0.528 \text{ for air}, \qquad (12)$$

and where $\gamma$ is a specific heat constant that is between approximately 1.3 and 1.4 for air. $P_{critical}$ is defined as the pressure ratio at which the velocity of the air flowing past the throttle valve 112 equals the velocity of sound, which is referred to as choked or critical flow. The compressible flow module 464 outputs the desired area to the throttle actuator module 116, which controls the throttle valve 112 to provide the desired opening area.

Figure 6:
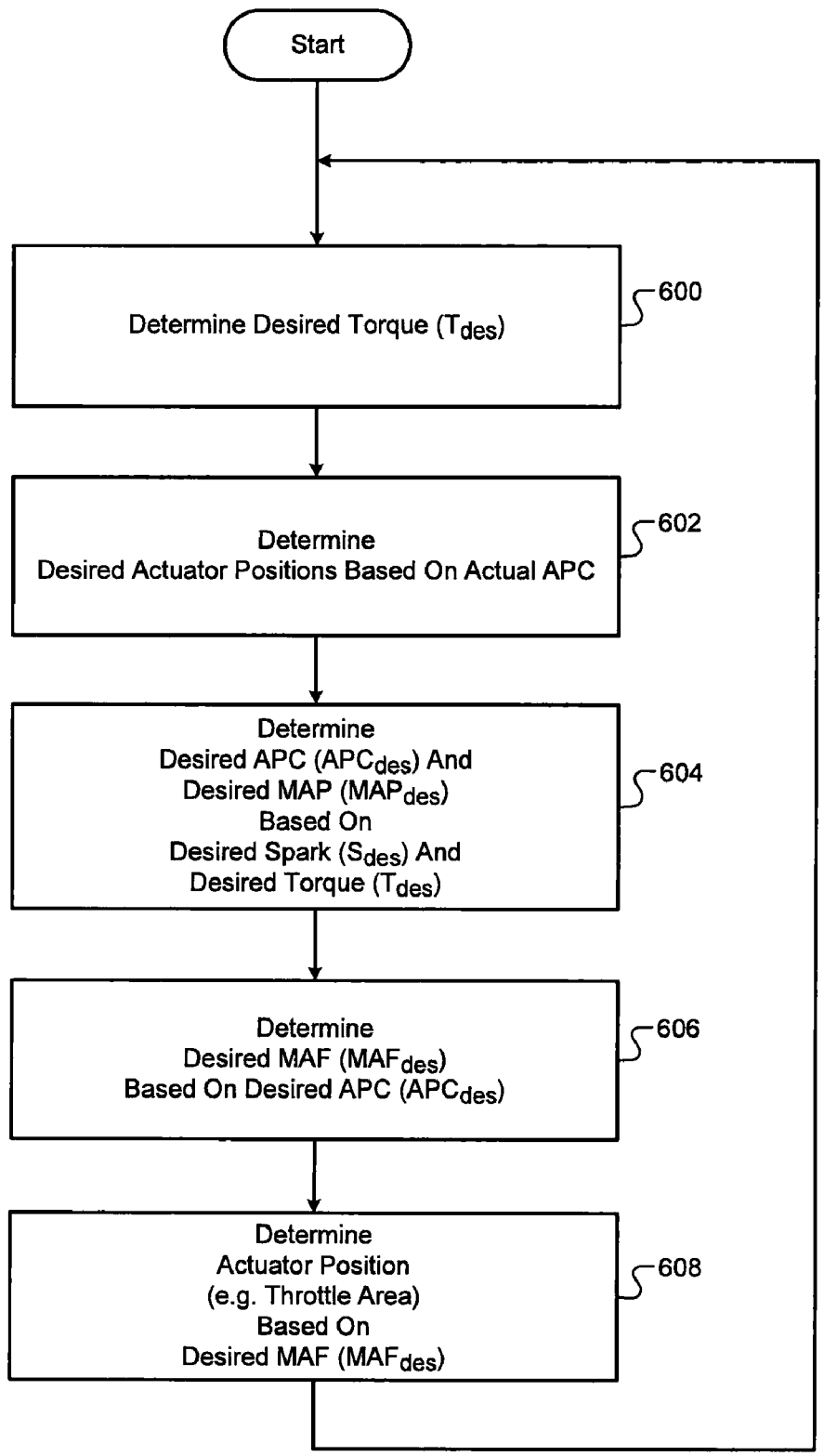
FIG. 6 is a flowchart depicting exemplary steps performed by the predicted torque module according to the principles of the present disclosure.

Referring now to FIG. 6, a flowchart depicts exemplary steps performed by the predicted torque control module 316. Control begins in step 600, where control determines the desired engine torque ($T_{des}$). Control continues in step 602, where control determines desired actuator positions based on the current measured APC ($APC_{meas}$). Control continues in step 604, where control determines a desired APC ($APC_{des}$) and a desired MAP ($MAP_{des}$) based on the current desired actuator positions, the current desired spark ($S_{des}$), and the current desired torque ($T_{des}$). Control continues in step 606, where control determines a desired MAF ($MAF_{des}$) based on the desired APC. Control continues in step 608, where control determines a new desired actuator position based on at least one of the desired MAF/APC and the desired MAP. In various implementations, the desired actuator position determined in step 608 may not be included as one of the desired actuator positions determined in step 602.

For example, control may determine a desired throttle area based on the desired MAF and the desired MAP. Control may also determine desired boost pressure based on desired MAP. Control may also determine desired phaser angle based on the desired APC. From step 608, control returns to step 600.

Figure 7:
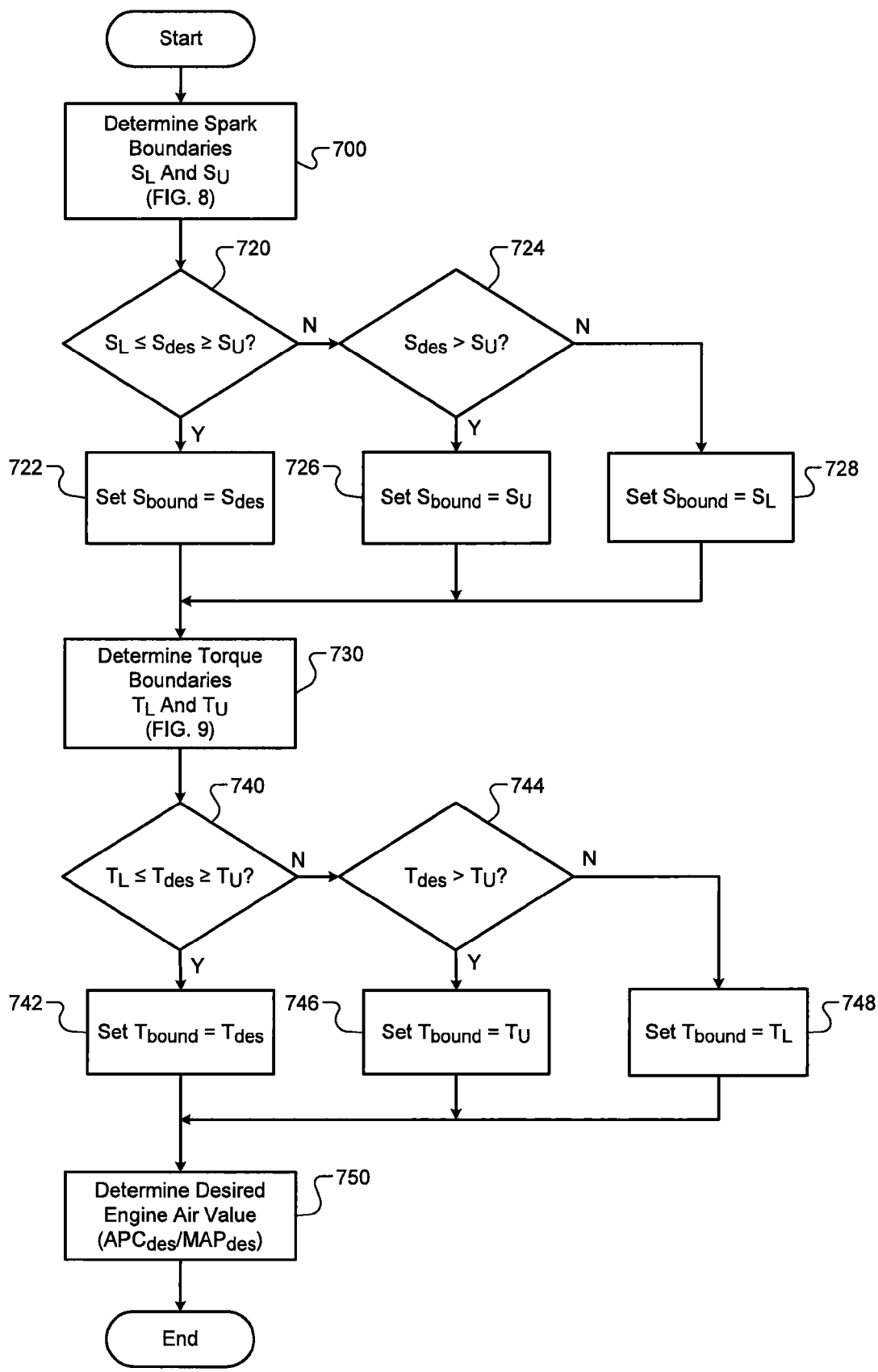
FIG. 7 is a partial flowchart depicting exemplary steps performed by the inverse APC and MAP modules according to the principles of the present disclosure.

Referring now to FIG. 7, a flowchart depicts exemplary steps performed by the inverse APC module 428 to determine the desired APC. Control begins in step 700, where control determines a lower spark boundary ($S_L$) and an upper spark boundary ($S_U$) that will be used to determine the bounded spark value ($S_{bound}$). The lower and upper spark boundaries define a range of spark values for which the slope of the torque curve in equation (3) remains positive. This first boundary condition is desired to ensure a direct relationship (i.e. positive relationship) between the torque values (e.g. desired torque) input to the inverse torque model and the APC values determined using the inverse torque model. Thus, as the value of the bounded torque input to the model increases, the value of the desired APC determined by the model will also increase.

While a direct relationship is desired and provided herein for determining the desired APC, it is contemplated that an inverse relationship may be alternatively desired for calculating other actuator positions based on the torque value input to the inverse torque model. The principles of the present disclosure will enable one skilled in the art to implement an inverse torque model that ensures an inverse relationship between torque values input in the inverse torque model and the actuator position determined using the model.

A direct relationship between torque and APC can be ensured by limiting the spark values used in equations (4) and (5) to ensure that the derivative of the torque in equation (3) with respect to A (i.e. dT/dA) remains positive. Taking the derivative (dT/dA) of equation (3) results in the equation:

$$dT/dA = K_{AS2}*S^2 + K_{AS}*S + K_A + 2*K_{A2}*A \quad (13)$$

By setting dT/dA equal to zero in equation (13) and solving for the corresponding value of A, the critical value ($A_{crit}$) at which the sign of dT/dA changes (e.g. goes from positive to negative or from negative to positive) can be determined. The term spark poles will be used herein to refer to points at which dT/dA, as defined in equation (13), equals zero. Setting dT/dA equal to zero in equation (13) and solving for A yields the following equations:

$$0 = K_{AS2}*S^2 + K_{AS}*S + K_A + 2*K_{A2}A \quad (14)$$

$$A_{CRIT} = \frac{-K_{AS2}*S^2 - K_{AS}*S - K_A}{2*K_{A2}} \quad (15)$$

Thus, for a given spark value, dT/dA will maintain its sign until the critical value ($A_{crit}$) is achieved. Put another way, dT/dA will be positive for all torque values between a lower torque boundary ($T_L$) and an upper torque boundary ($T_U$) if the value of dT/dA at $T_L$ is positive. Furthermore, if dT/dA at A=0 is positive, then dT/dA will be positive from $T_L$ to $T_U$. Additionally, by requiring $K_A$ to be positive, dT/dA at S=0 and A=0 can be ensured to be positive (see equation (13) above). The lower spark boundary ($S_L$) and the upper spark boundary ($S_U$) can then be determined by setting A equal to zero in equation (14) and solving for the corresponding spark values using the following equations:

$$S_L = \frac{-b_2 - \sqrt{b_2^2 - 4*a*c}}{2*a} \quad (16)$$

$$S_U = \frac{-b_2 + \sqrt{b_2^2 - 4*a*c}}{2*a}, \quad (17)$$

where
$a = K_{AS2}$ (or $K'_{AS2}$)
$b = K_{AS}$ (or $K'_{AS}$)
$c = K_A$ (or $K'_A$)

Thus, in step 700, control may use equation (16) to determine the lower spark boundary ($S_L$) and equation (17) to determine the upper spark boundary ($S_U$). From the foregoing equations (16) and (17) it will be appreciated that there may be no practical lower limit for $S_L$ and/or no practical upper limit for $S_U$ for certain values of $K_{AS2}$ and $K_{AS}$. In this case, control can set the value of the corresponding spark boundary to a default spark boundary value as will be described in more detail below.

Figure 8:
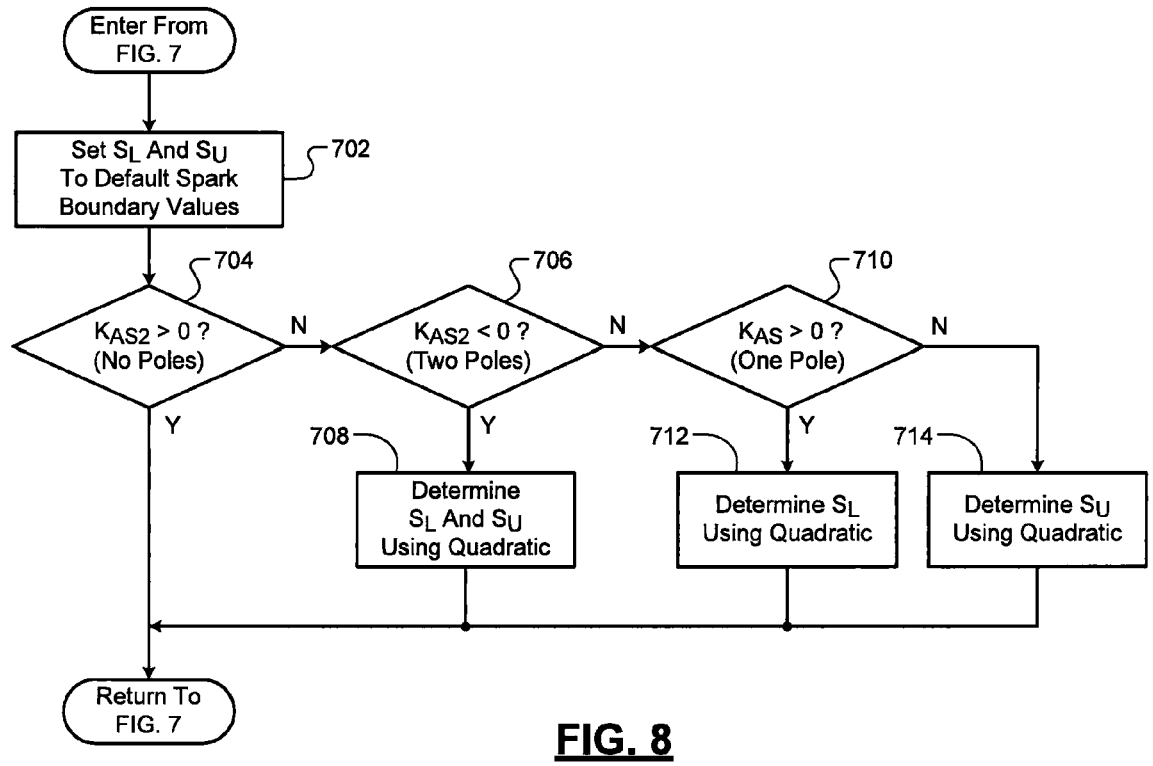
FIG. 8 is a partial flowchart depicting additional exemplary steps performed by the inverse APC and MAP modules according to the principles of the present disclosure.

Referring now to FIG. 8, a flowchart depicts the exemplary steps performed by control in step 700 to determine the lower and upper spark boundaries using equations (16) and (17). Beginning in step 702, control sets the value of the lower spark boundary ($S_L$) to a default lower spark boundary value and the value of the upper spark boundary ($S_U$) to a default upper spark boundary value. For exemplary purposes, the default lower spark boundary value can be −100 degrees and the default upper spark boundary value can be +100 degrees.

Next in step 704, control determines whether the value of $K_{AS2}$ (a in equations (16-17)) is greater than zero. If $K_{AS2}$ is greater then zero, control in step 700 ends and control proceeds in step 720 (FIG. 7). If $K_{AS2}$ is not greater then zero, then control proceeds in step 706. In step 706, control determines whether the value of $K_{AS2}$ is less than zero. If $K_{AS2}$ is less than zero, then control proceeds in step 708, otherwise control proceeds in step 710. In step 708, control determines the value of the lower and upper spark boundaries ($S_L$ and $S_U$) using equations (16) and (17), respectively. Thus, in step 708, control sets the values of the lower and upper spark boundaries equal to the values obtained using equations (16) and (17). From step 708, control in step 700 ends and control proceeds in step 720.

In step 710, control determines whether the value of $K_{AS}$ (b in equations (16-17)) is greater than zero. If $K_{AS}$ is greater than zero, then control proceeds in step 712, otherwise control proceeds in step 714. In step 712, control determines the value of the lower spark boundary ($S_L$) using equation (16). Thus, in step 712, control sets the value of the lower spark boundary equal to the value obtained using equation (16). From step 712, control in step 700 ends and control proceeds in step 720 (FIG. 7). In step 714, control determines the value of the upper spark boundary ($S_U$) using equation (17). Thus, in step 714, control sets the value of the lower spark boundary equal to the value obtained using equation (17). From step 714, control in step 700 ends and control proceeds in step 720 (FIG. 7).

Referring again to FIG. 7, control continues in step 720 where control determines whether the desired spark value ($S_{des}$) is greater than or equal to the lower spark boundary ($S_L$) and lower than or equal to the upper spark boundary ($S_U$) determined in step 700. If the desired spark value is greater than or equal to the lower spark boundary and lower than or equal to the upper spark boundary, then control proceeds in step 722, otherwise control proceeds in step 724. In step 722, control sets the bounded spark value ($S_{bound}$) equal to the desired spark value ($S_{des}$) and control proceeds in step 730.

In step 724, control determines whether the desired spark value ($S_{des}$) is greater than the upper spark boundary ($S_U$). If the desired spark value is greater than the upper spark boundary, then control proceeds in step 726, otherwise control proceeds in step 728. In step 726 control sets the bounded spark value ($S_{bound}$) equal to the value of the upper spark boundary ($S_U$) and control proceeds in step 730. In step 728, control sets the bounded spark value ($S_{bound}$) equal to the value of the lower spark boundary ($S_L$) and control proceeds in step 730.

From the foregoing steps 720-728, it will be appreciated that the bounded spark value will be equal to the desired spark value when the desired spark value falls within the range of spark values defined by the lower spark boundary and the upper spark boundary. When the desired spark value falls outside the range of spark values defined by the lower and upper spark boundaries, the bounded spark value will be set to either the lower spark boundary or the upper spark boundary, depending on which value is nearest to the desired spark value. It will also be appreciated that the bounded spark value, vis-à-vis the lower and upper spark boundaries, is determined based on the number of spark poles. As illustrated in steps 704, 706, 710 (see FIG. 8) the number of spark poles is dependent on the APC k-values, specifically $K_{AS2}$ and $K_{AS}$.

Control continues in step 730 where control determines the lower torque boundary ($T_L$) and the upper torque boundary ($T_U$) that will be used to determine a bounded torque value ($T_{bound}$). The lower and upper torque boundaries represent the minimum and maximum torque values, respectively, as defined by the inverse torque model represented by equation (4).

Under the inverse torque model in equation (4), the lower torque boundary ($T_L$) will occur when the APC value (i.e. A) is zero. Thus, in step 730, control can determine the lower torque limit ($T_L$) using equation (3) by setting A equal to zero and S equal to the bounded spark value ($S_{bound}$). The resulting equation can be expressed as follows:

$$T_L = K_{S2}*(S_{bound})^2 + K_S*(S_{bound}) + K_{S2}*(S_{bound})^2 + K_R \quad (18)$$

Under the inverse torque model in equation (4), maximum torque will be generated at an APC value (i.e. A) at which $dT/dA$ is equal to zero. Thus, the upper torque boundary ($T_U$) can be determined by substituting the formula for the critical value ($A_{crit}$) in equation (15) for A in equation (3) and solving for the resulting torque value. However, it will be appreciated that the resulting equation for maximum torque is a fourth-order equation in spark and therefore there will be no theoretical maximum torque value when the value of $K_{42}$ is greater than or equal to zero. In this case, control can set the value of the upper torque boundary to a default upper torque boundary value as will be described in more detail below. The following chart summarizes the values for the minimum and maximum torque values that result from the foregoing discussion.

| Torque Boundaries | $K_{42}$ >0 | $K_{42}$ =0 | $K_{42}$ <0 |
|---|---|---|---|
| Minimum | T(S, A = 0) | T(S, A = 0) | T(S, A = 0) |
| Maximum | Infinity | Infinity | T(S, $A_{crit}$) |

Figure 9:
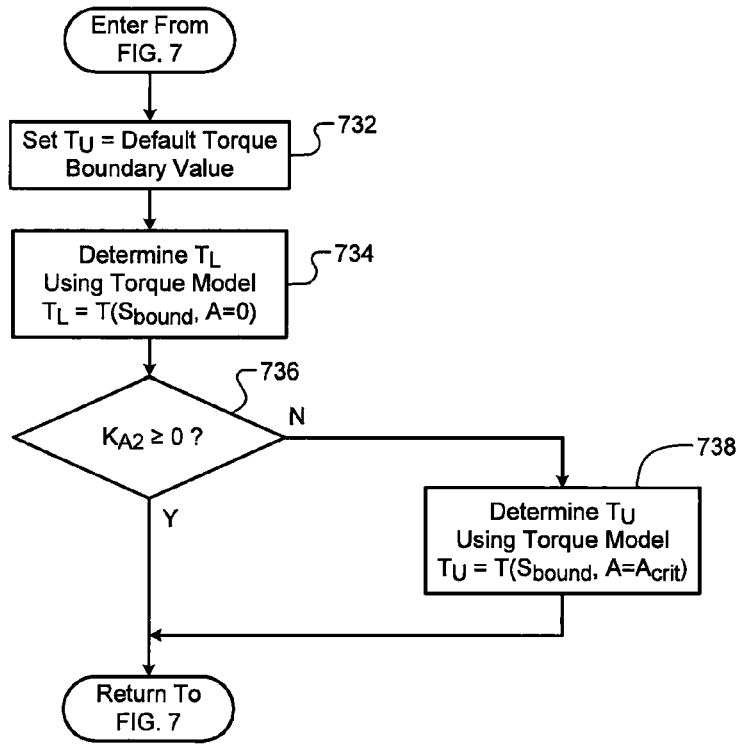
FIG. 9 is a partial flowchart depicting additional exemplary steps performed by the inverse APC and MAP modules according to the principles of the present disclosure.

Referring now to FIG. 9, a flowchart depicts the exemplary steps performed by control in step 730 to determine the lower and upper torque boundaries using equations (3) and (15). Beginning in step 732, control sets the value of the upper torque boundary ($T_U$) equal to a default upper torque boundary value. For exemplary purposes, the value of the default upper torque boundary value can be 1e6. From step 732 control proceeds in step 734 where control determines the value of the lower torque boundary ($T_L$) using equation (3) by setting A equal to zero and S equal to the bounded spark value ($S_{bound}$) and solving for the resulting torque value. In step 734, control sets the value of the lower torque boundary equal to the resulting torque value thus obtained.

Control proceeds in step 736, where control determines whether the value of $K_{42}$ is greater than or equal to zero. If $K_{42}$ is greater than or equal to zero, then control in step 730 ends and control proceeds in step 740 (FIG. 7). If $K_{42}$ is not greater than or equal to zero, control proceeds in step 738. In step 738, control first determines the value of $A_{crit}$ using equation (15) by setting S equal to the bounded spark value ($S_{bound}$). Next, control determines the value of the upper torque boundary ($T_U$) using equation (3) by setting A equal to the value of $A_{crit}$ determined using equation (15) and setting S equal to the bounded spark value ($S_{bound}$). In step 738, control sets the value of the upper torque boundary equal to the resulting torque value thus obtained. From step 738, control in step 730 ends and control proceeds in step 740.

Referring again to FIG. 7, in step 740 control determines whether the desired torque value ($T_{des}$) is greater than or equal to the lower torque boundary ($T_L$) and less than or equal to the upper torque boundary ($T_U$). If the desired torque is greater than or equal to the lower torque boundary and less than or equal to the upper torque boundary, then control proceeds in step 742, otherwise control proceeds in step 744. In step 742, control sets the bounded torque value ($T_{bound}$) equal to the desired torque value ($T_{des}$). From step 742, control proceeds in step 750.

In step 744, control determines whether the desired torque value ($T_{des}$) is greater than the upper torque boundary ($T_U$). If the desired torque is greater than the upper torque boundary, then control proceeds in step 746, otherwise control proceeds in step 748. In step 746, control sets the bounded torque value ($T_{bound}$) equal to the value of the upper torque boundary ($T_U$). From step 746 control proceeds in step 750. In step 748, control sets the bounded torque value ($T_{bound}$) equal to the value of the lower torque boundary ($T_L$). From step 748, control proceeds in step 750.

From the foregoing steps 740-748, it will be appreciated that the bounded torque value will be equal to the desired torque value when the desired torque falls within the range of torque values defined by the lower torque boundary and the upper torque boundary. It will also be appreciated that when the desired torque value falls outside the range of torque values defined by the lower and upper torque boundaries, the bounded torque value will be set to either the lower torque boundary or the upper torque boundary, depending on which value is nearest to the desired torque value.

Control continues in step 750 where control determines a desired APC value (APC$_{des}$) based on the bounded spark value and the bounded torque value using equation (5) by setting S in equation (5) equal to the bounded spark value (S$_{bound}$) and T in equation (5) equal to the bounded torque value (T$_{bound}$).

With continued reference to FIGS. 7-9, the steps performed by the inverse MAP module 430 to determine the desired MAP (MAP$_{des}$) will now be described. Due to the substantial similarity between the steps performed by the inverse MAP module 430 and the inverse APC module 428 as previously described, only differences between the steps performed by the inverse MAP module and the inverse APC module will be described in detail.

Control begins in step 700 and proceeds through step 750 as previously described for the inverse APC module 428, including the steps 702-714 and steps 732-738. However, the determinations of the lower and upper spark boundaries in steps 704-714 (S'$_L$ and S'$_U$), the lower and upper torque boundaries (T'$_L$ and T'$_U$) in steps 734-738, the bounded spark value (S'$_{bound}$) in steps 720-728, the bounded torque value (T'$_{bound}$) in steps 740-748, and the desired MAP in step 750 are instead based on the MAP torque sensitivity constants (MAP k'-values).

Figure 10:
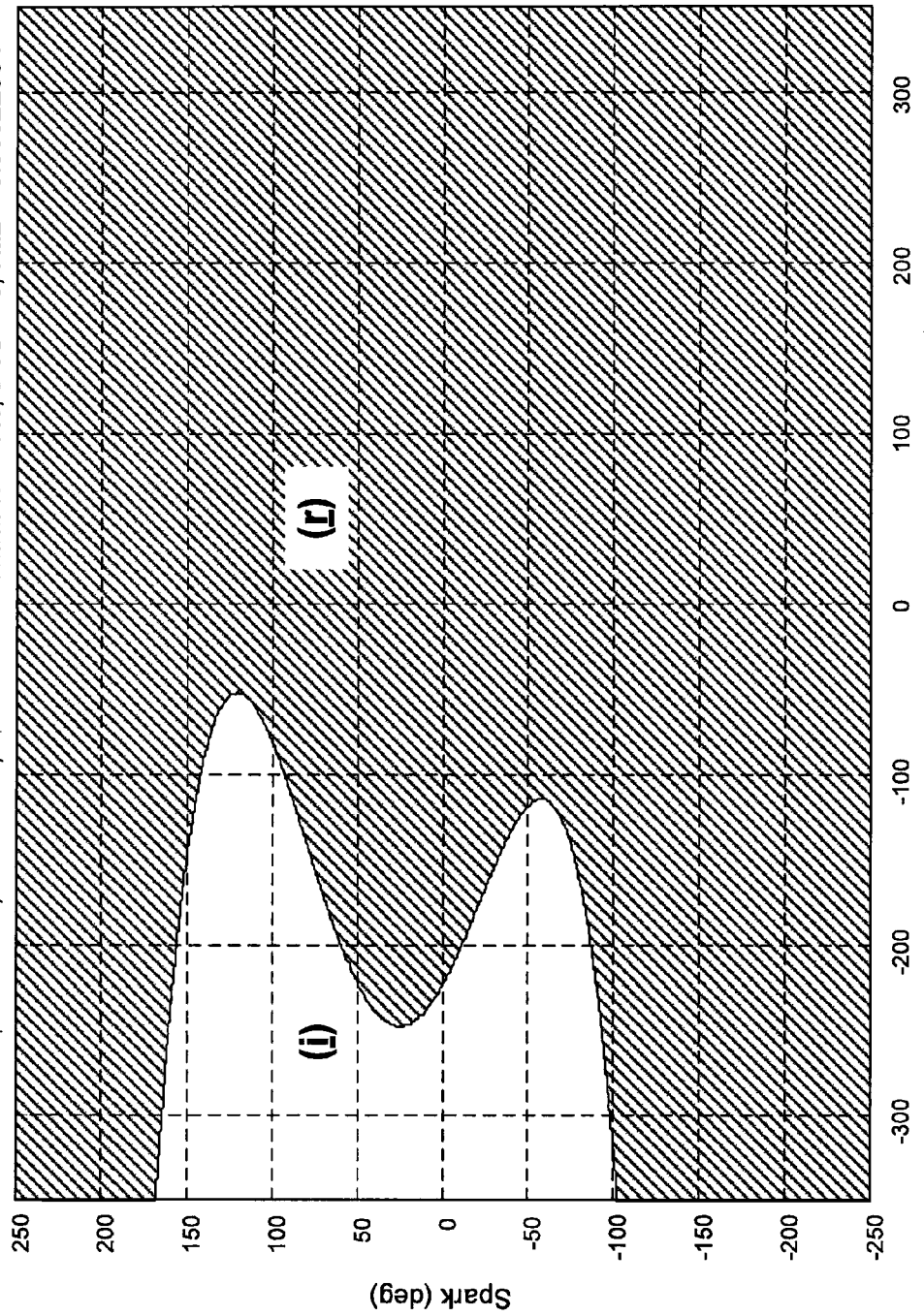
FIGS. 10 and 11 are exemplary two-dimensional graphs of torque versus spark according to the inverse torque model of the present disclosure.
Figure 11:
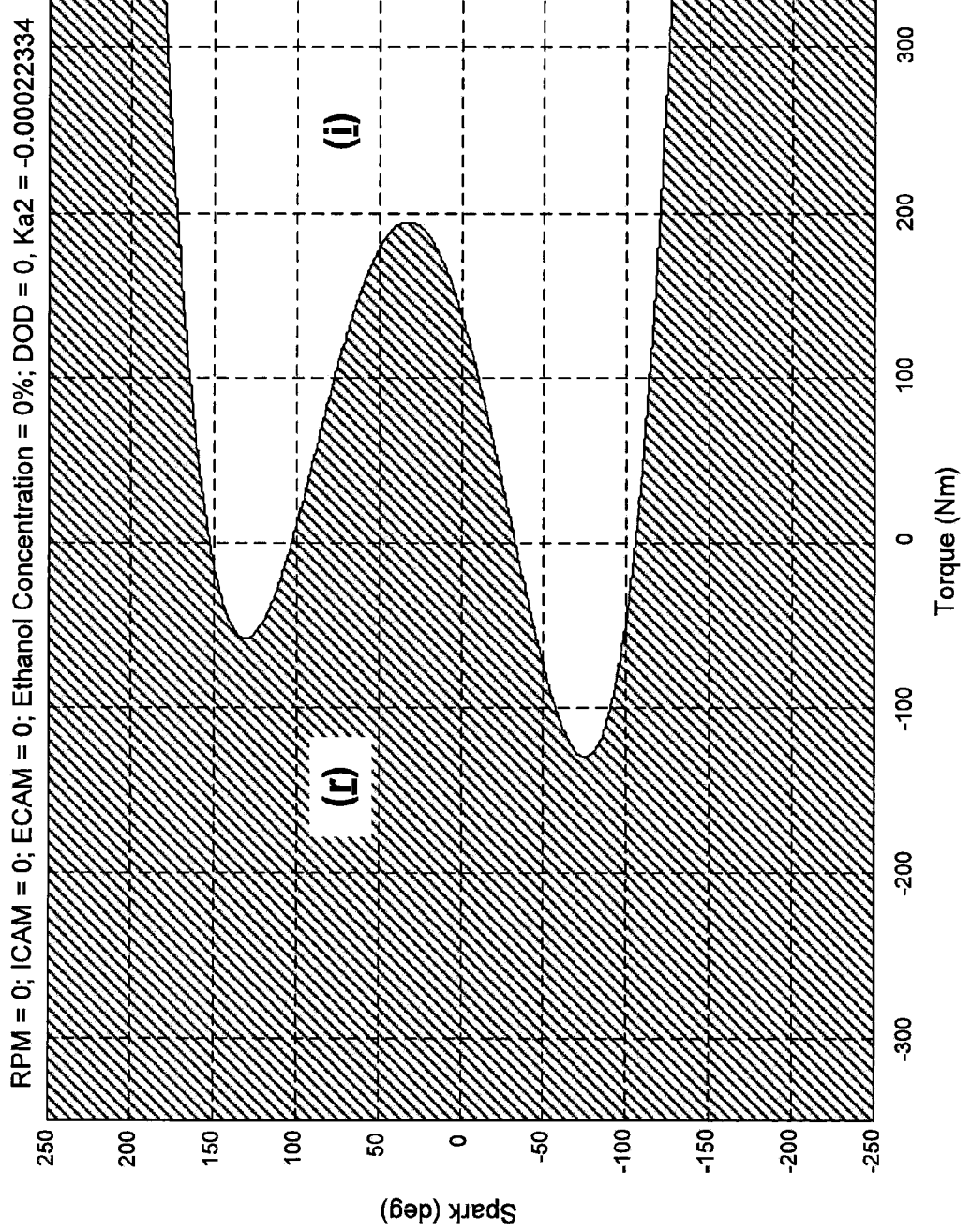
Figure 12:
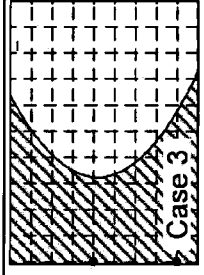
FIG. 12 is a summary chart of nine characteristic dT/dA planes according to the inverse torque model of the present disclosure.
Figure 13:
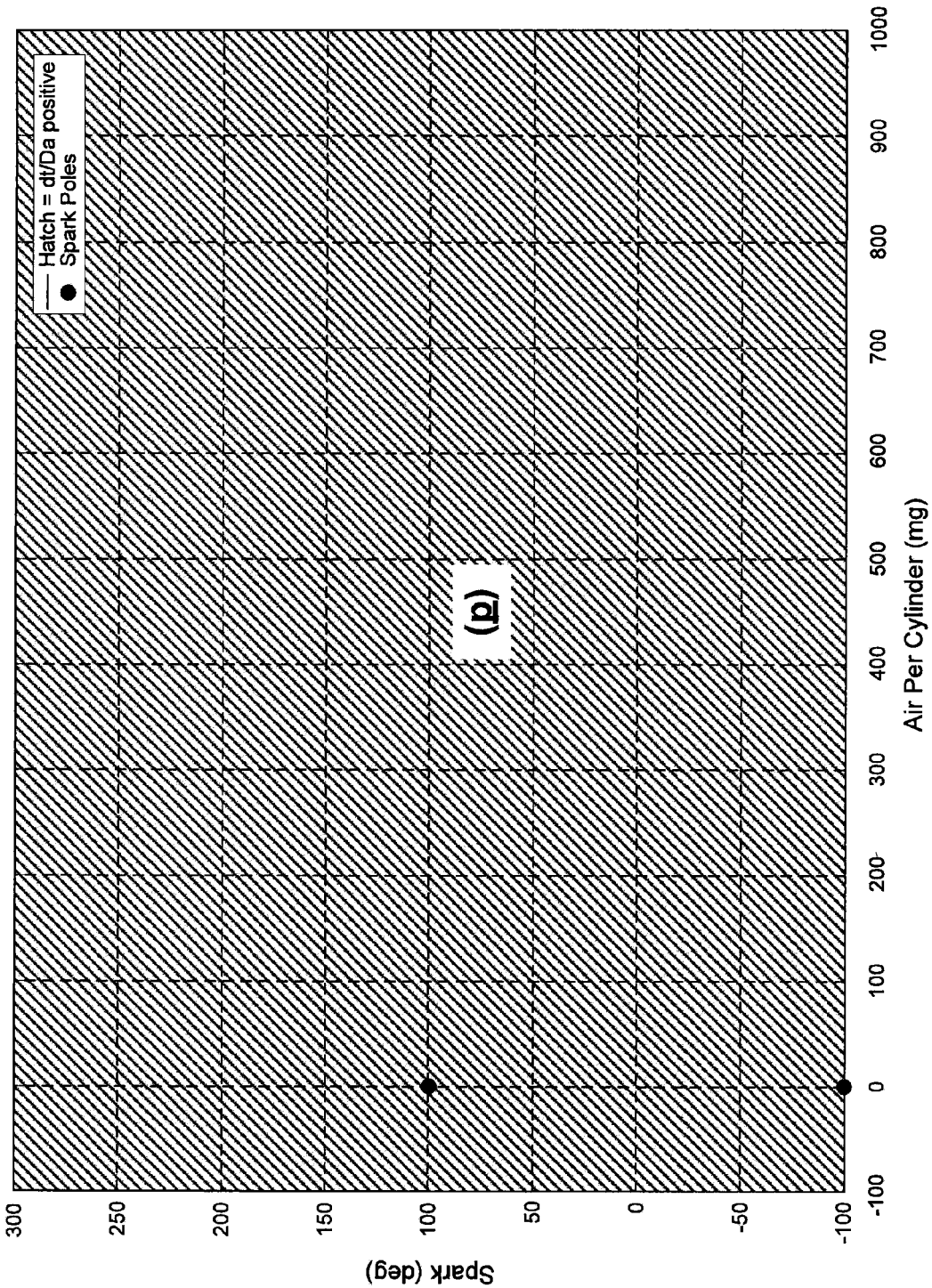
FIGS. 13 through 21 are exemplary two-dimensional graphs of APC versus spark for the nine planes shown in FIG. 12 that include lower and upper spark boundaries and spark poles according to the inverse torque model of the present disclosure.
Figure 14:
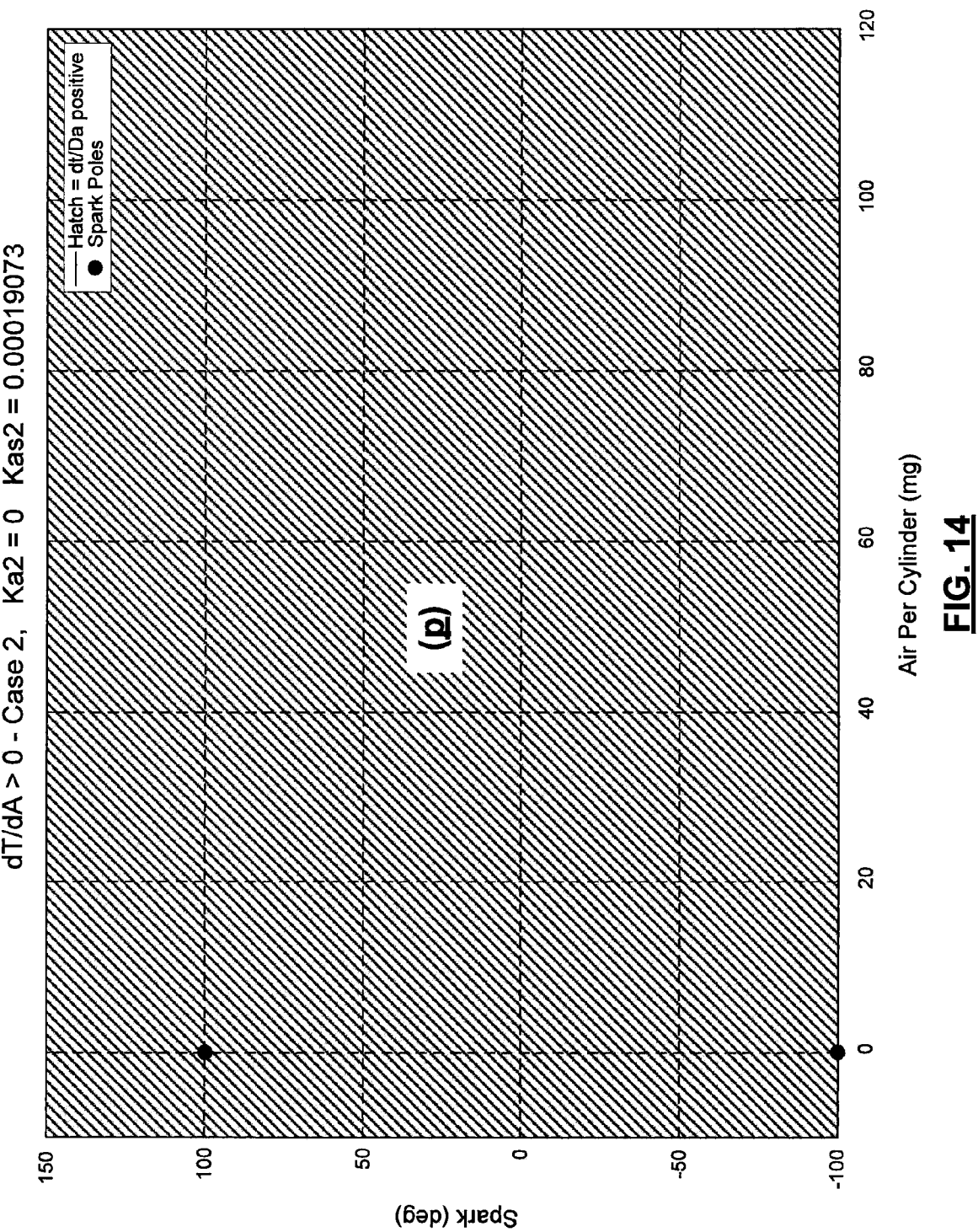
Figure 15:
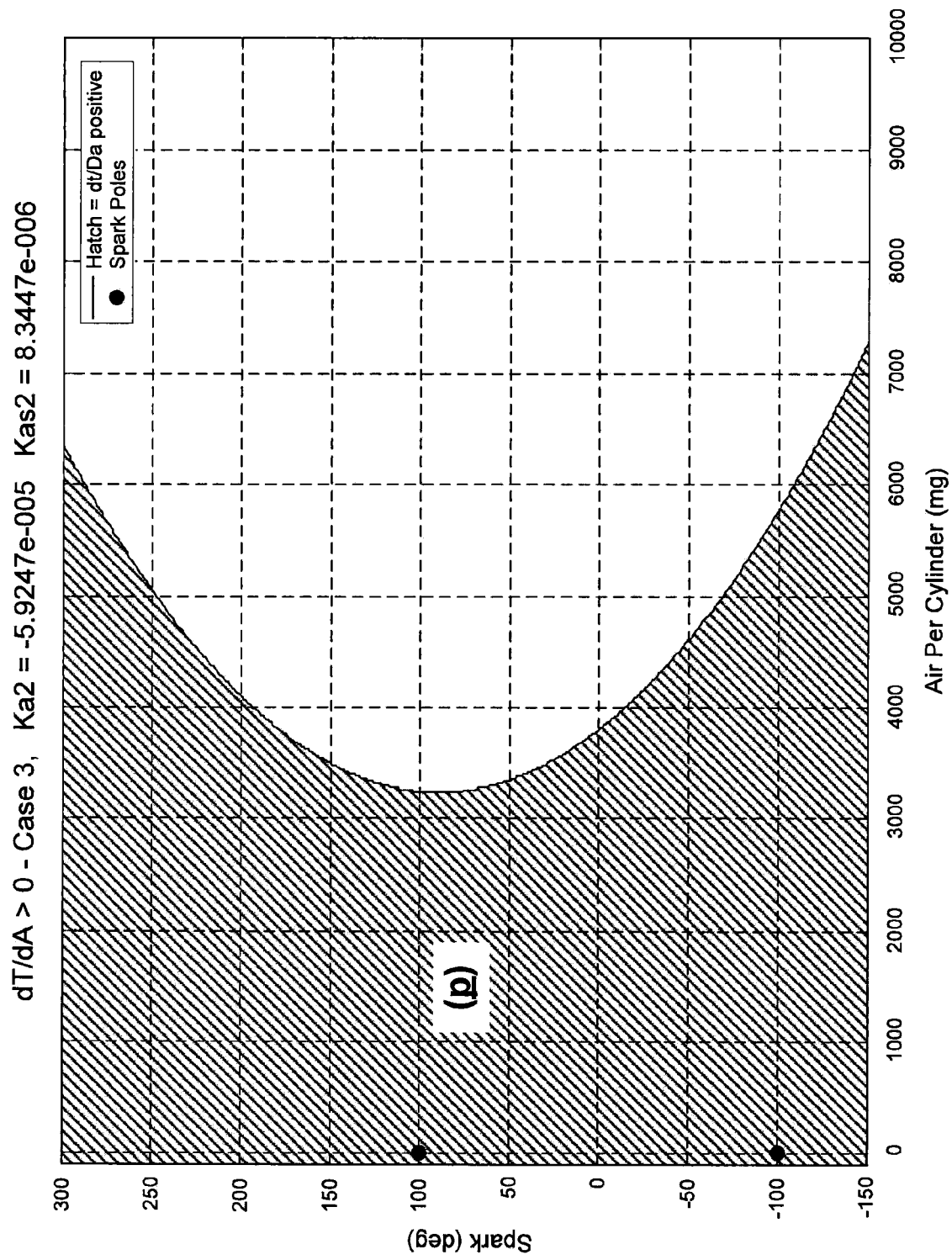
Figure 16:
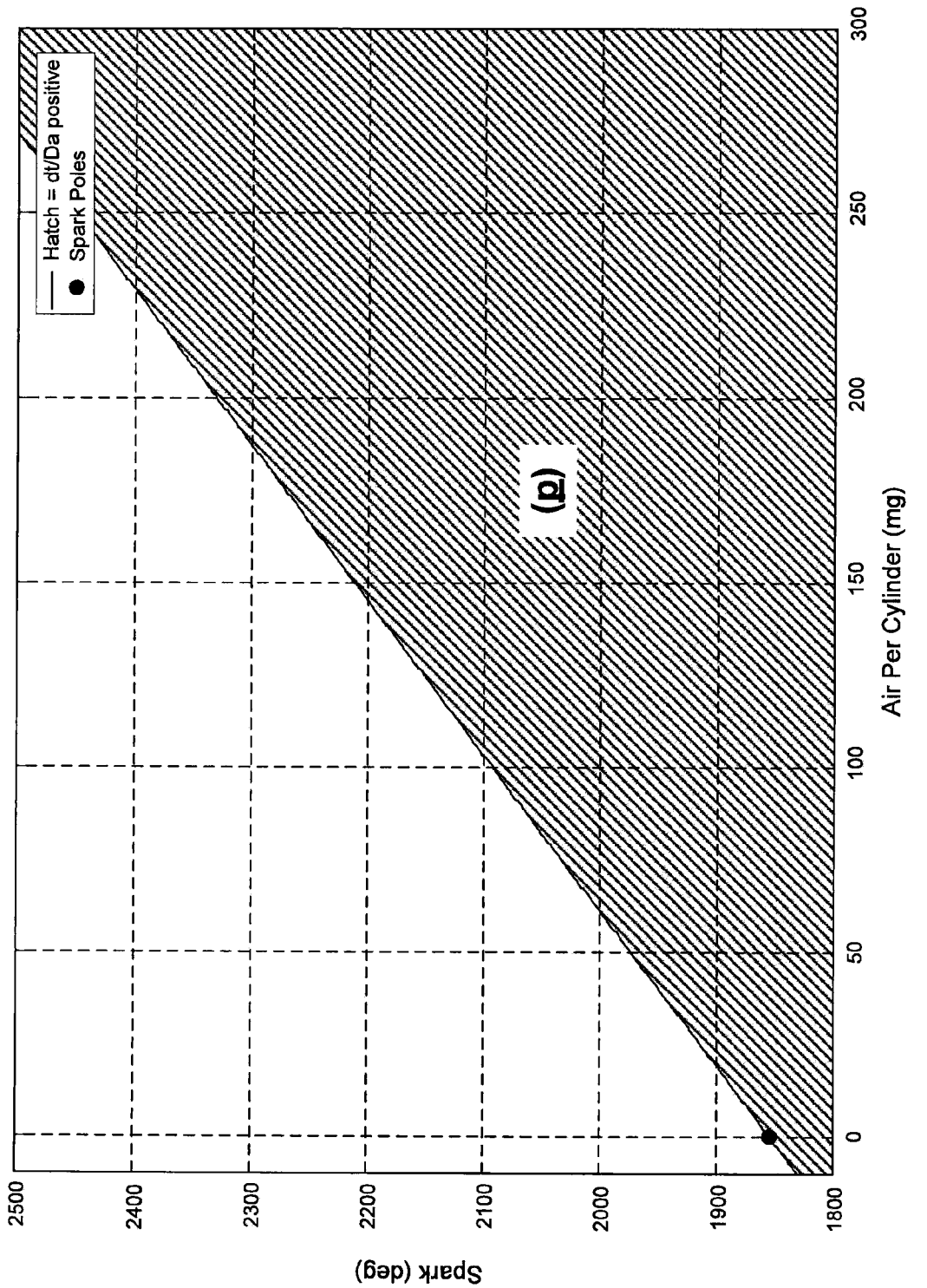
Figure 17:
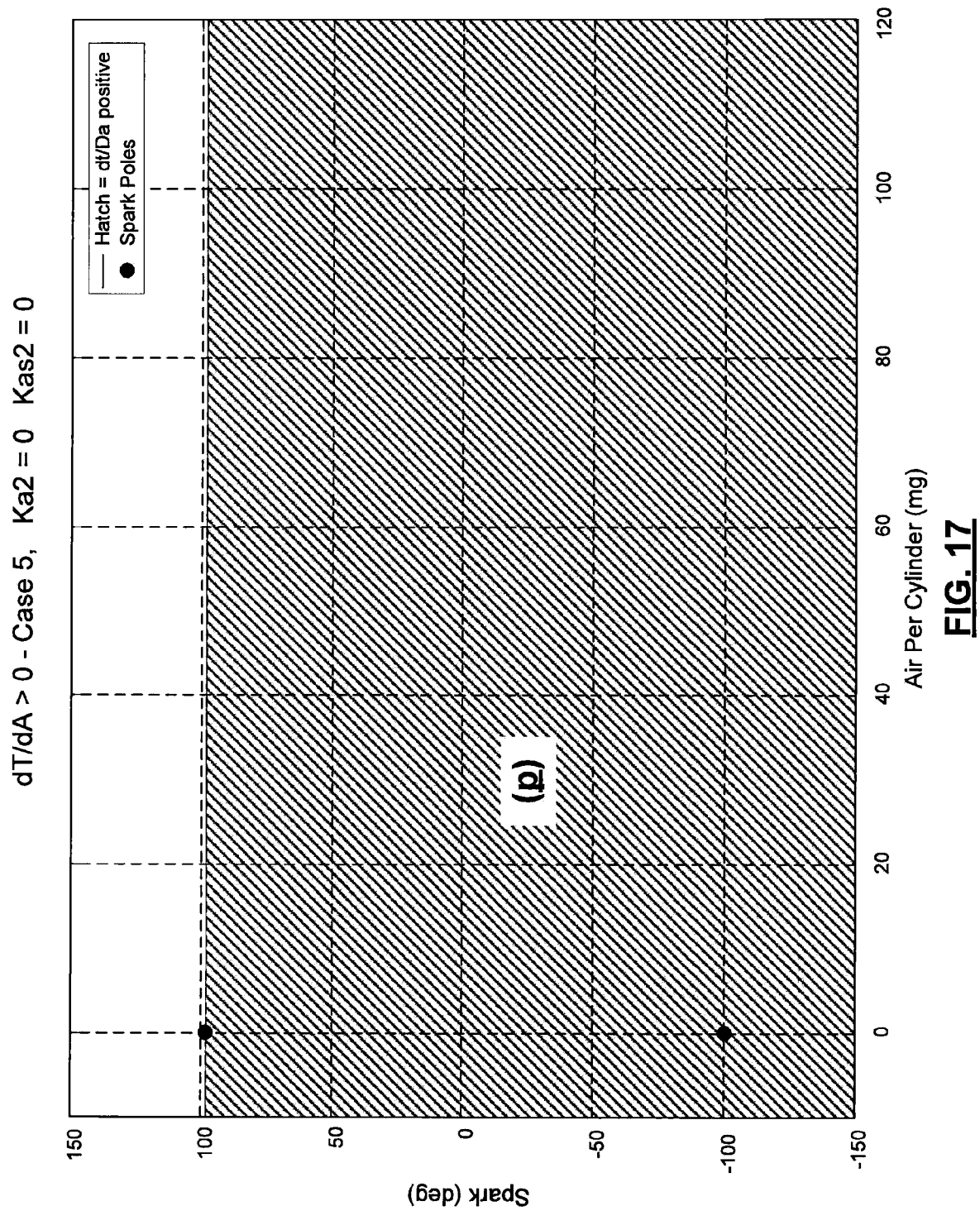
Figure 18:
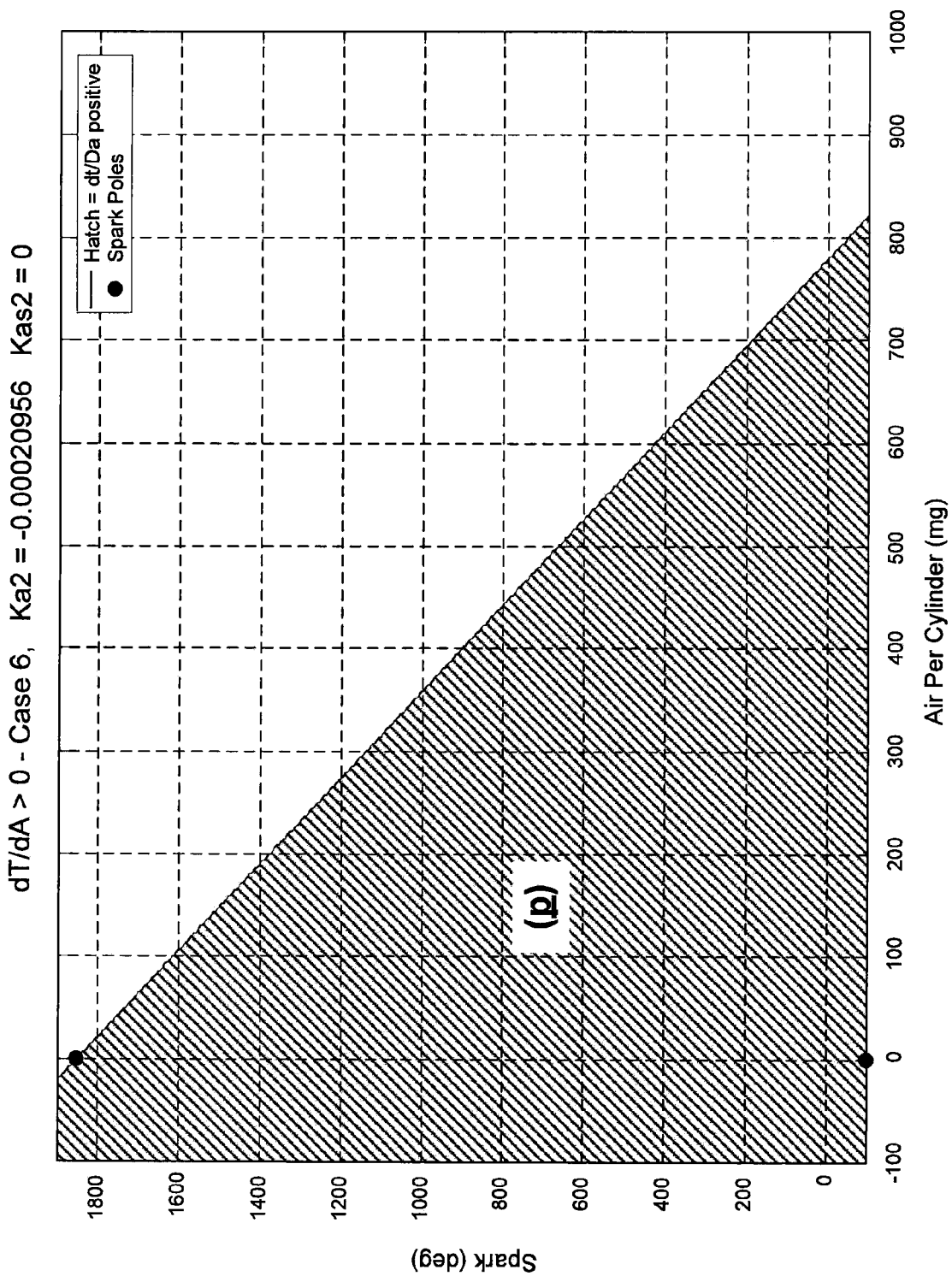
Figure 19:
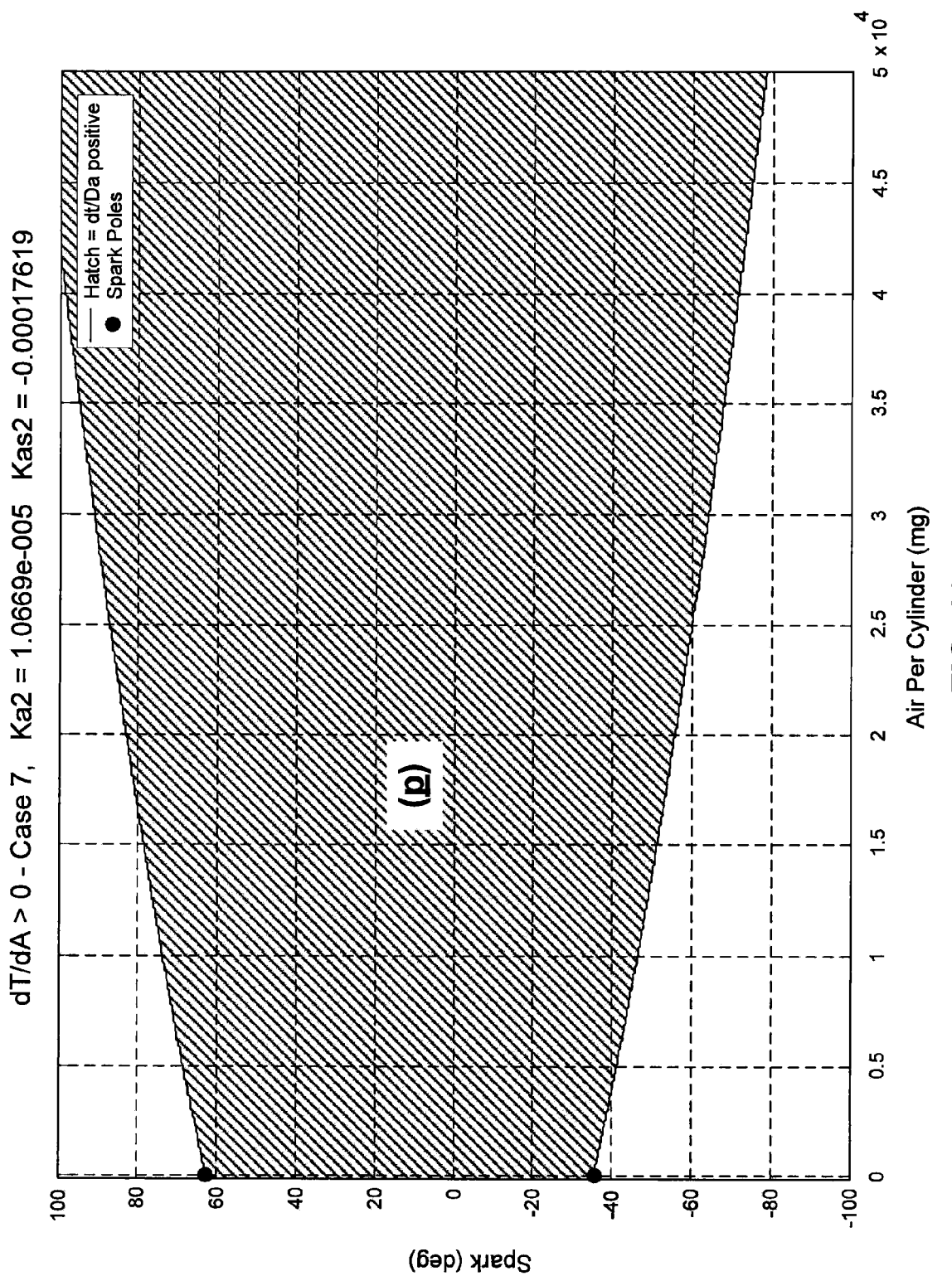
Figure 20:
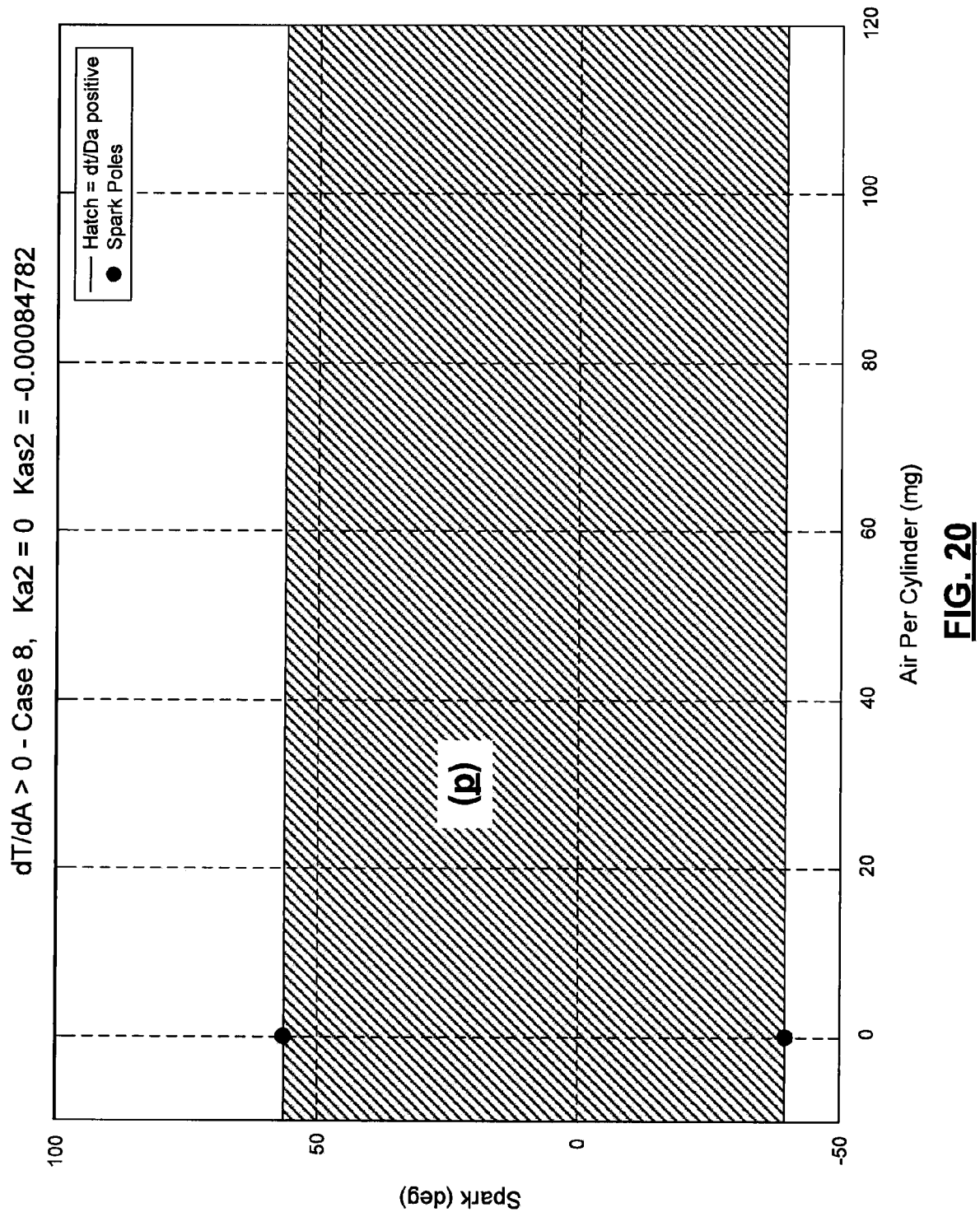
Figure 21:
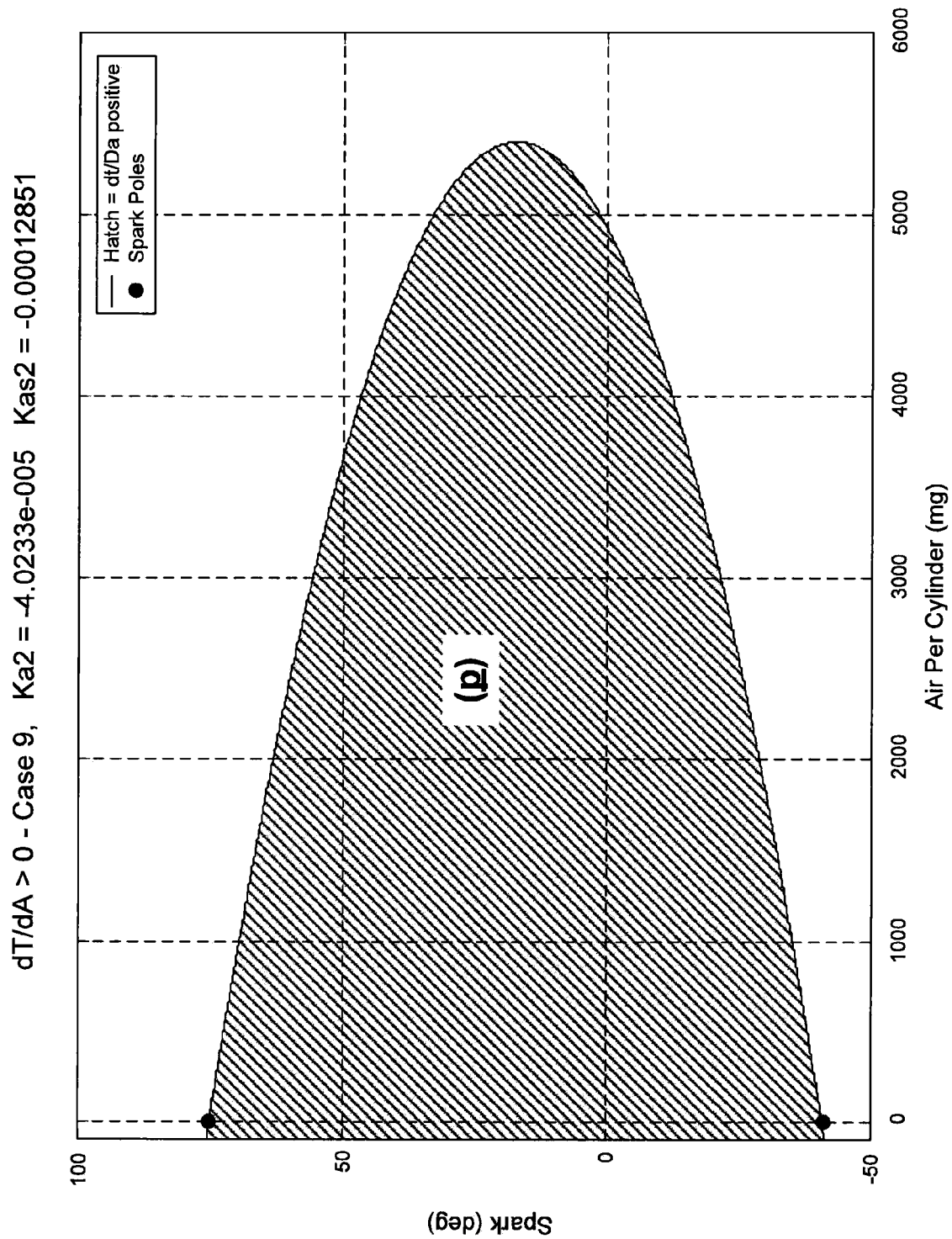
Figure 22:
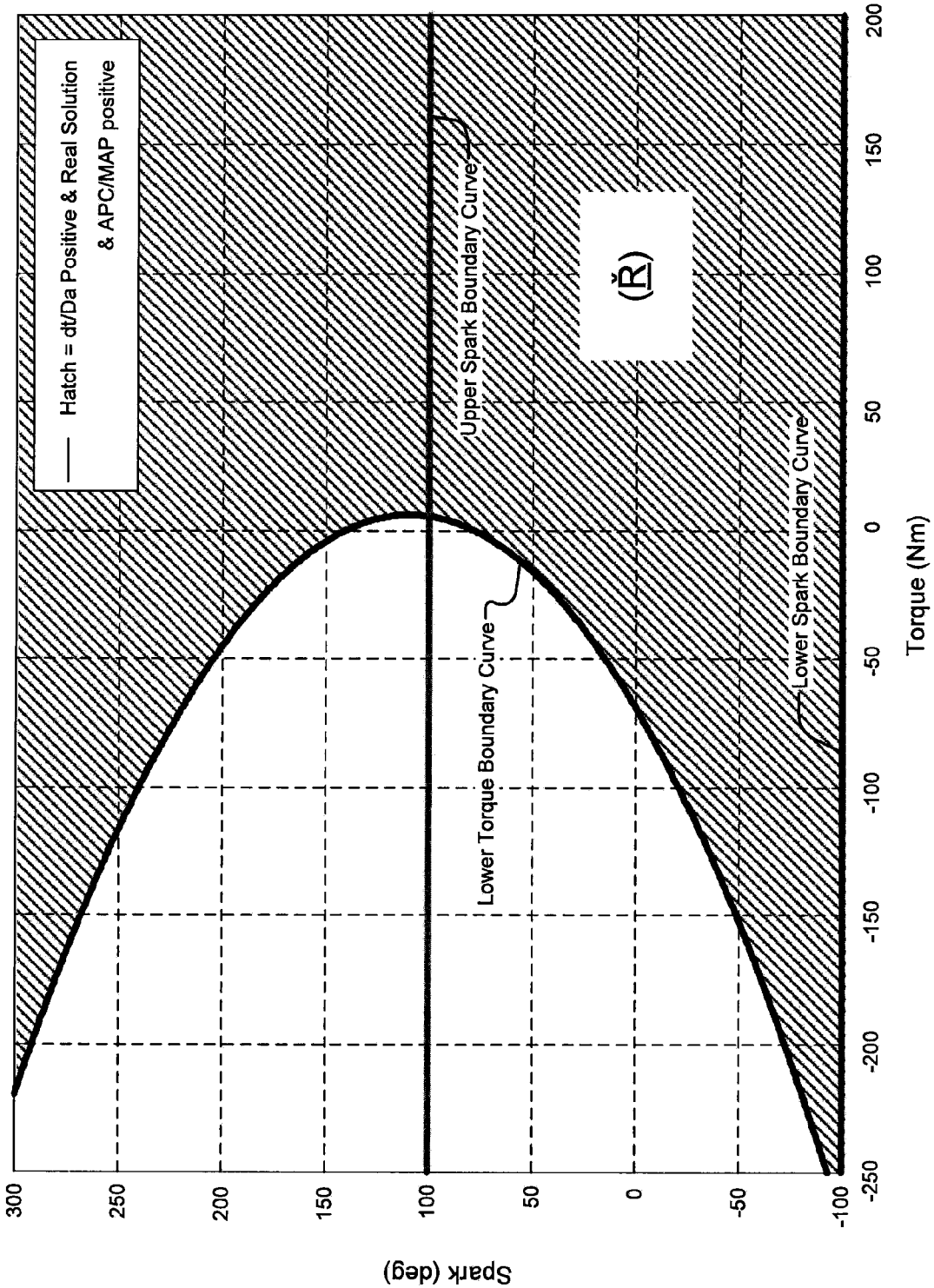
FIGS. 22 through 30 are exemplary two-dimensional graphs of torque versus spark, including the lower and upper spark poles and lower and upper torque boundaries, according to the inverse torque model of the present disclosure.
Figure 23:
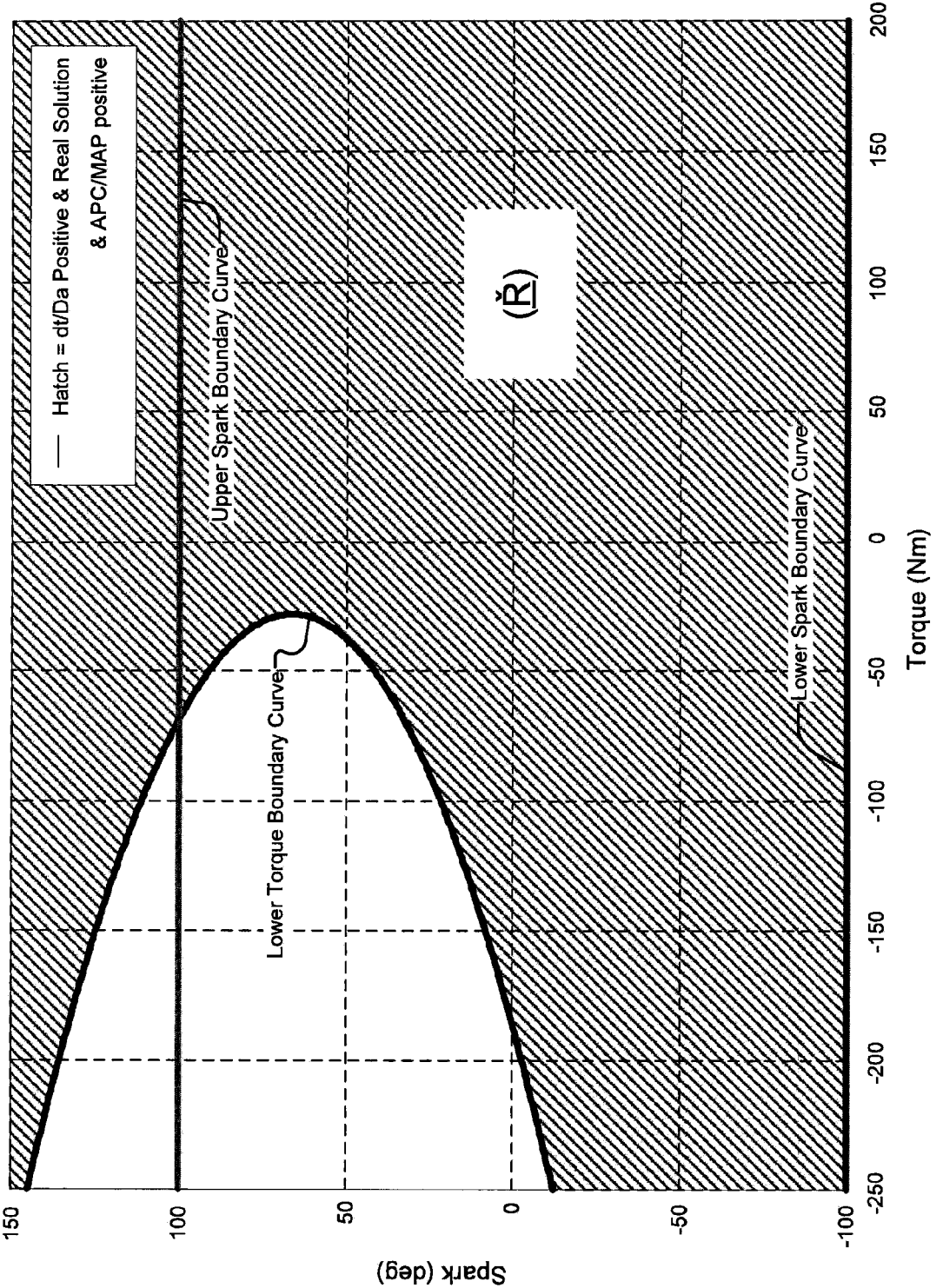
Figure 24:
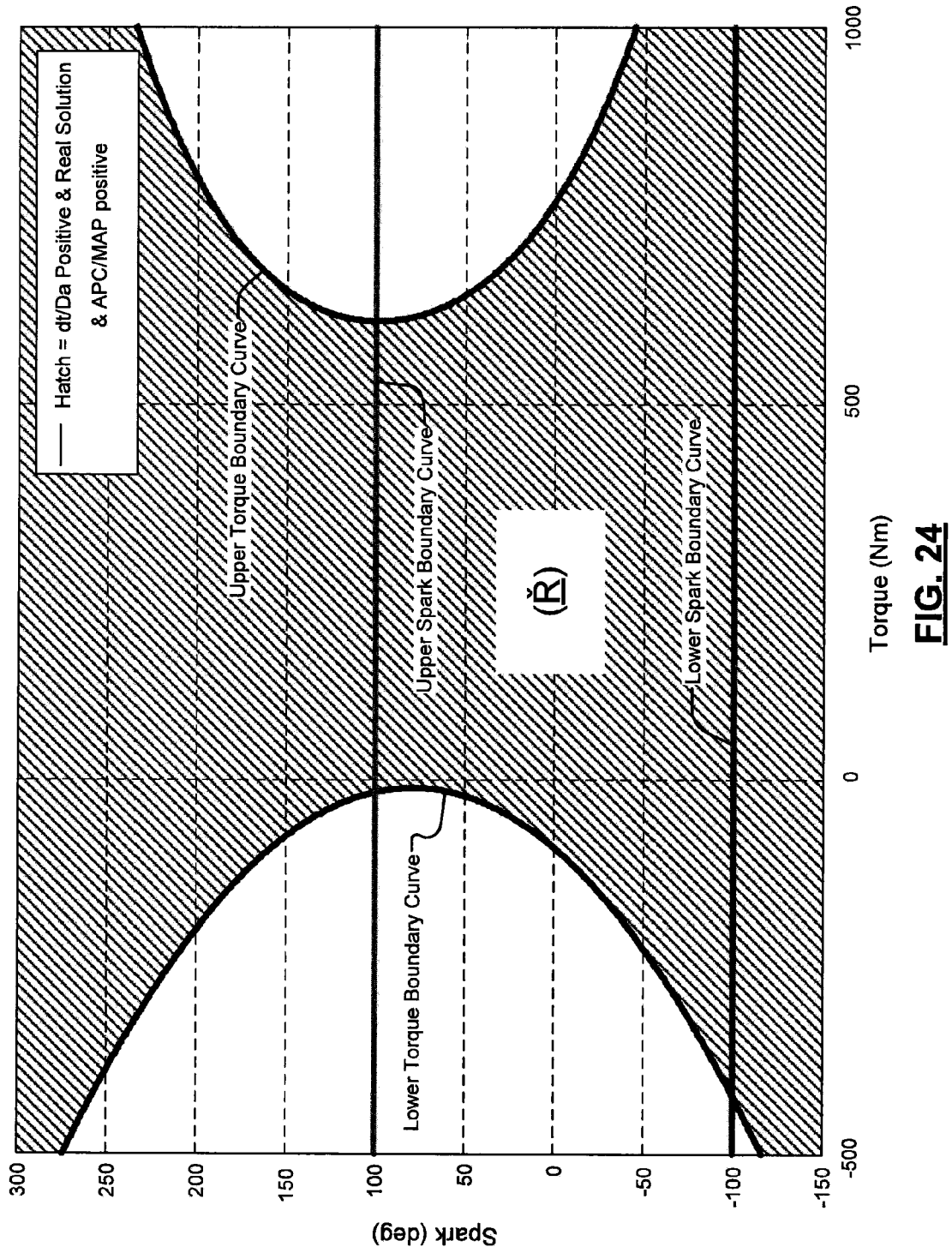
Figure 25:
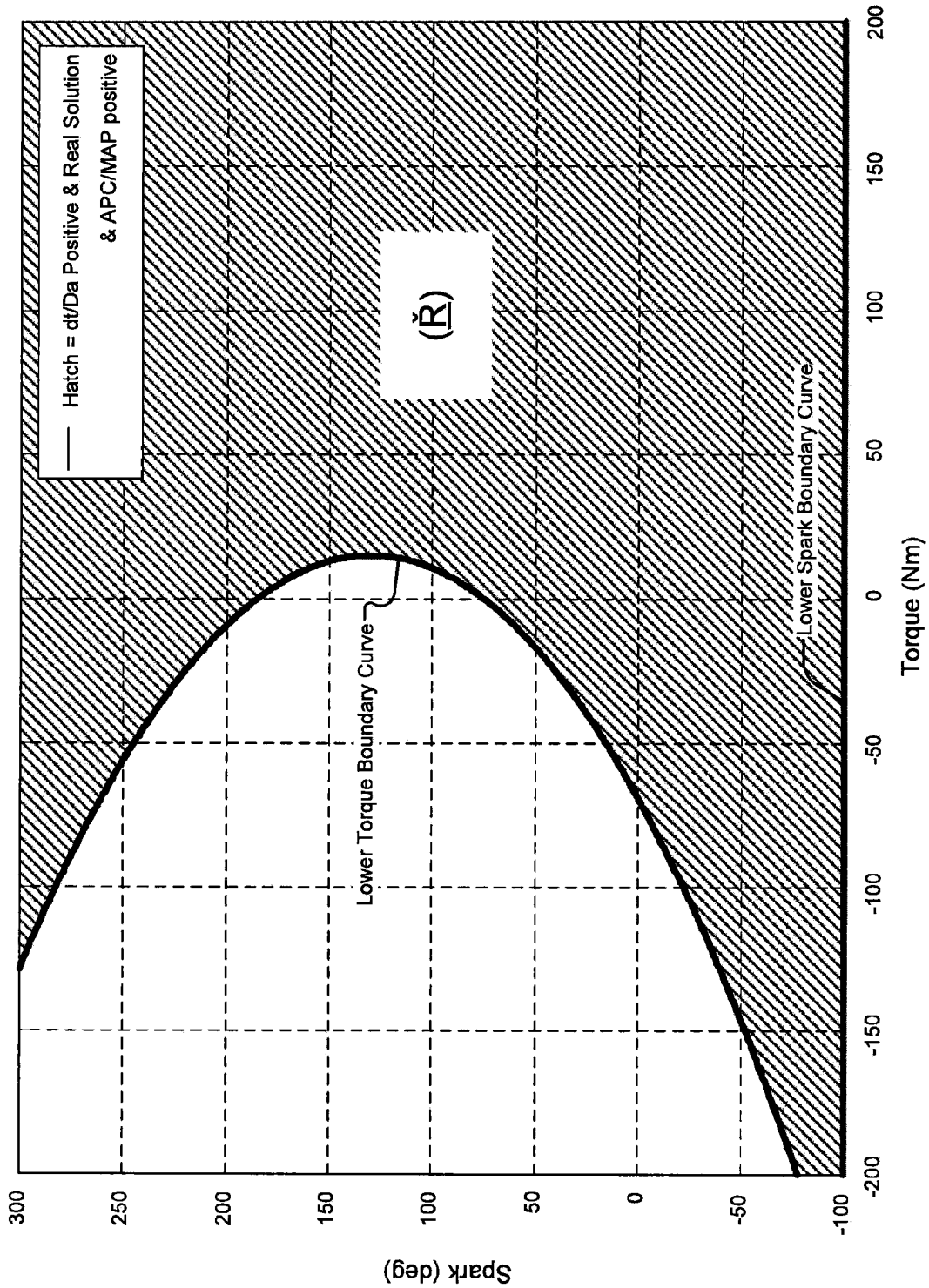
Figure 26:
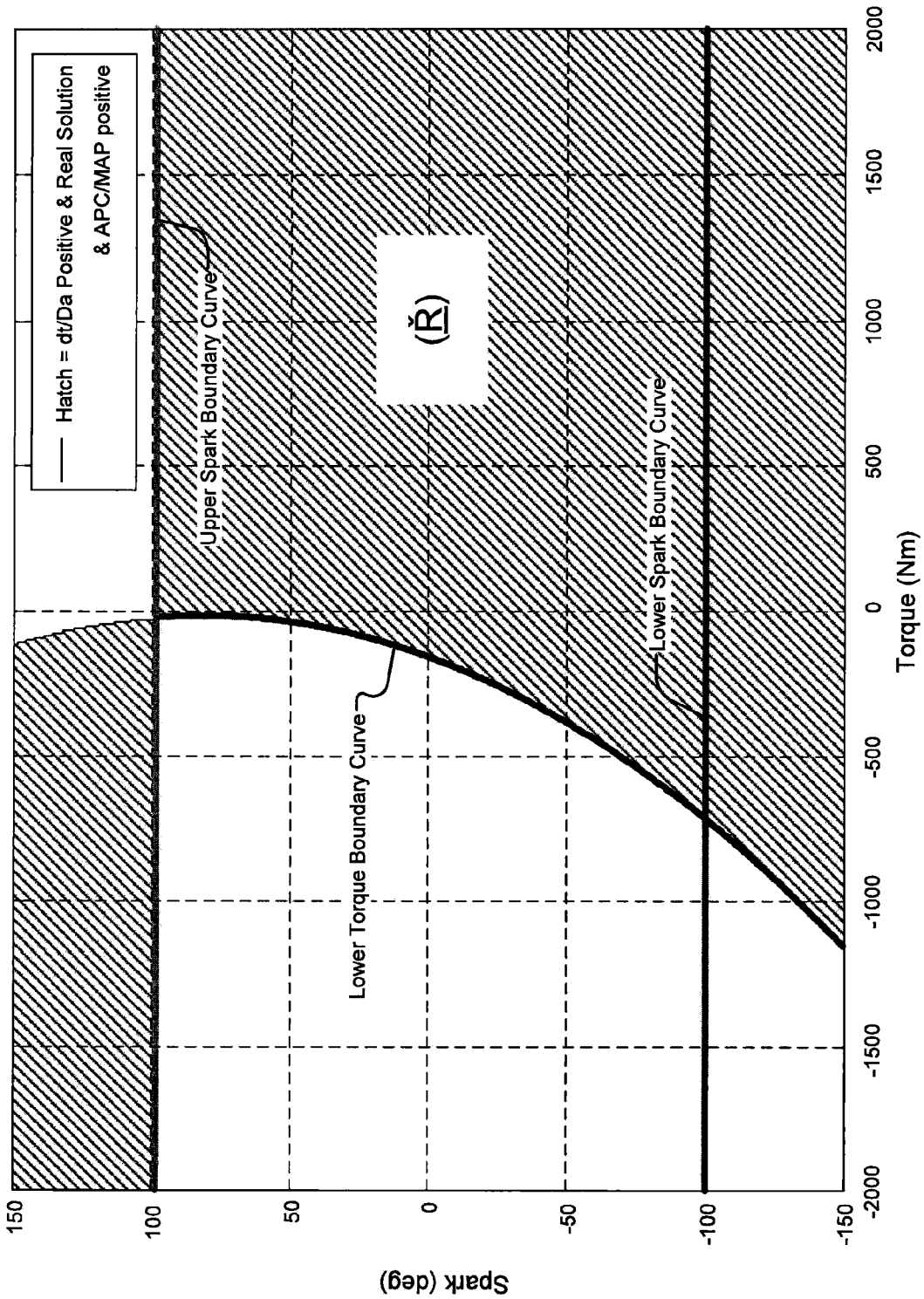
Figure 27:
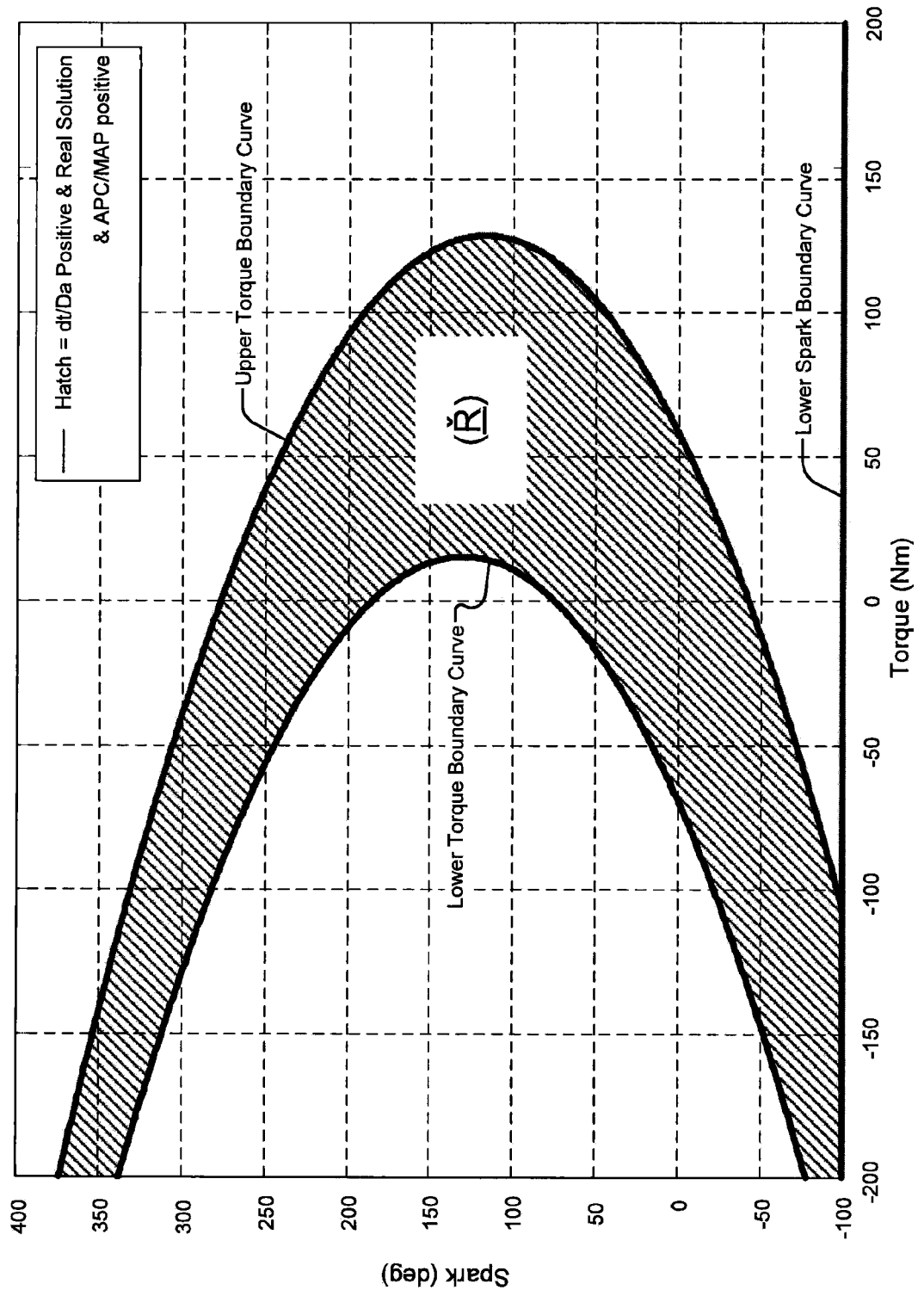
Figure 28:
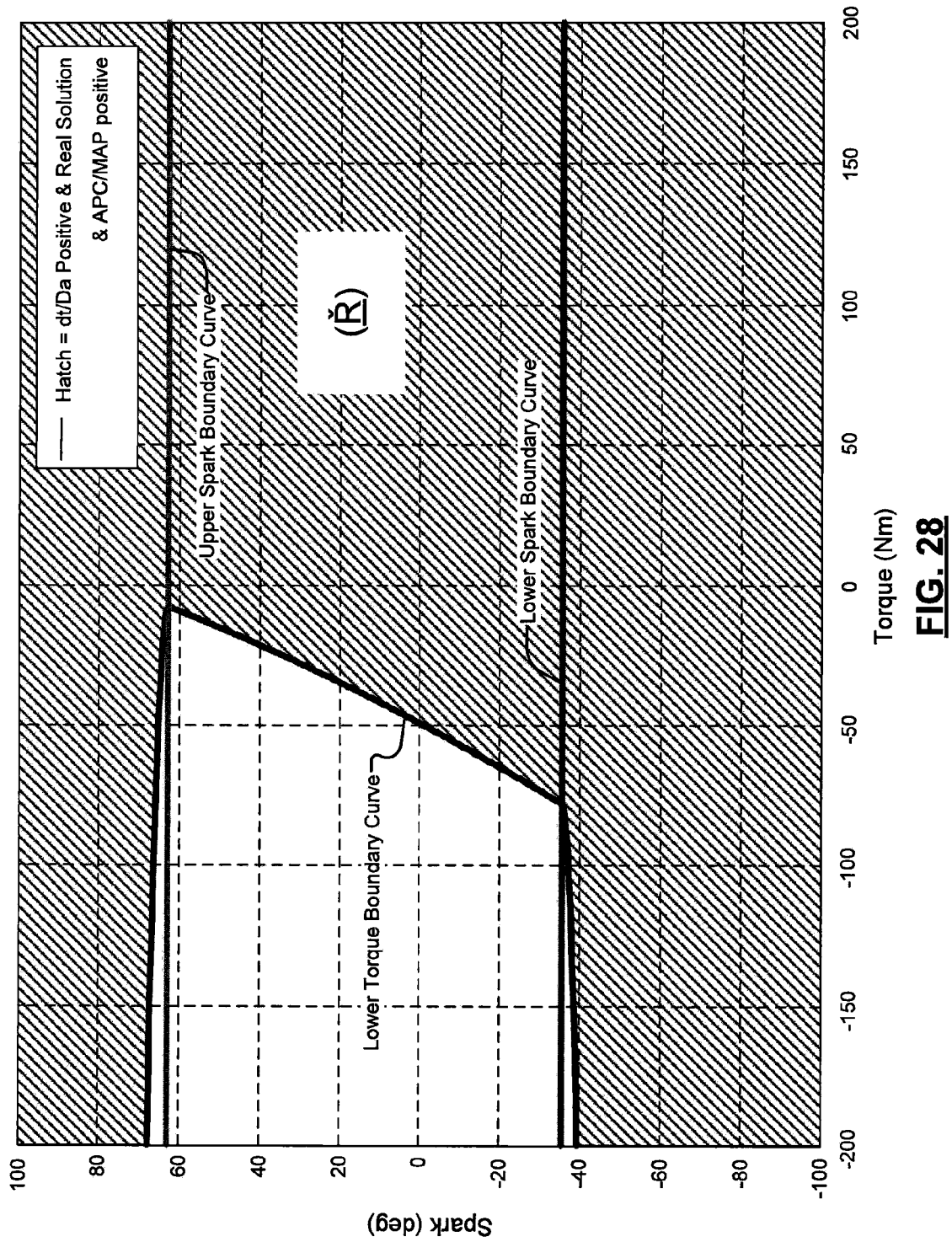
Figure 29:
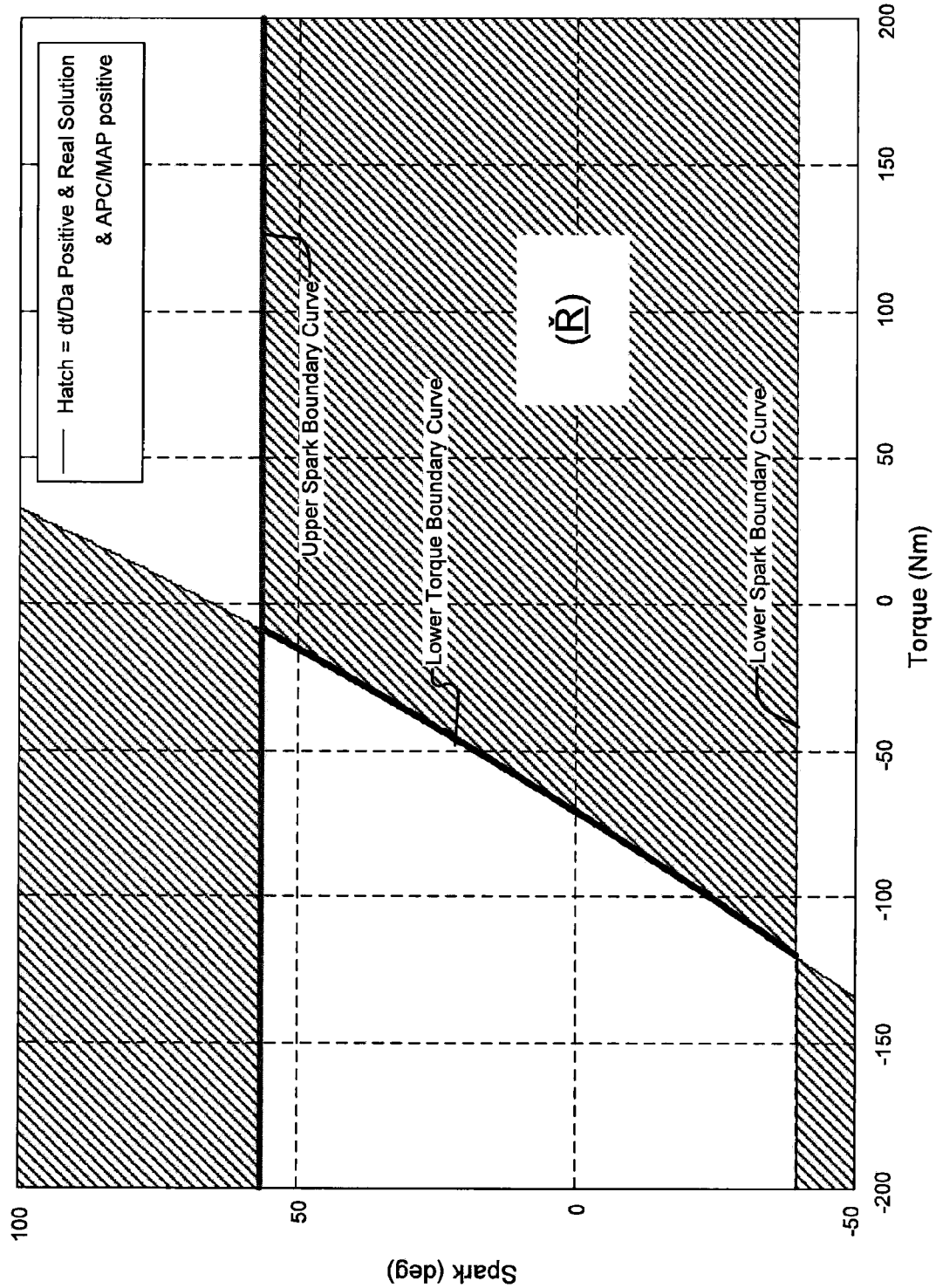
Figure 30:
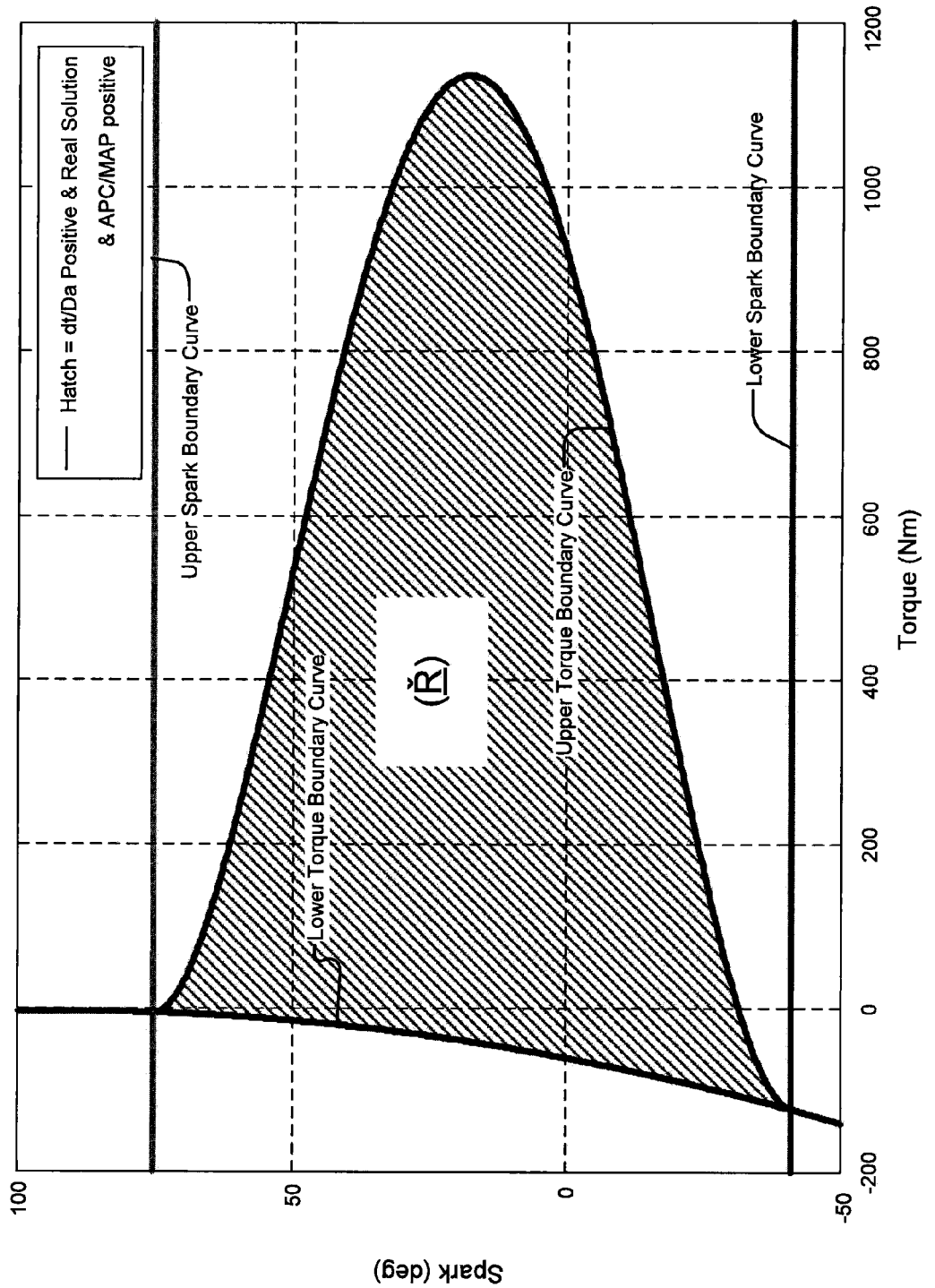

Referring to FIGS. 10-11, exemplary graphs of torque versus spark according to the torque model of the present disclosure are shown. For clarity, a spark-torque plane region (r) where the torque model produces rational torque values and dT/dA is greater than or equal to zero is indicated and identified. Similarly, a spark-torque plane region (i) where the torque model produces irrational torque values and dT/dA is less than zero is indicated and identified.

Referring to FIGS. 12-21, exemplary graphs of APC versus spark that include lower and upper spark boundaries/poles according to the inverse torque model of the present disclosure are shown. FIGS. 12-21 illustrate nine characteristic dT/dA planes, referred to as cases in the drawings, that result from torque sensitivity constants that vary between certain positive, negative, and zero values. For clarity, a positive dT/dA region (p) is identified in FIGS. 12-21. Additionally, lower and upper spark poles (i.e. spark boundary points) are plotted and identified.

Referring to FIGS. 22-30, exemplary graphs of the spark-torque planes for exemplary values of the torque sensitivity constants are shown. FIGS. 22-30 illustrate nine characteristic spark-torque planes that result from torque sensitivity constants that vary between certain positive, negative, and zero values. For clarity, a positive and real solution area (Ř) for which dT/dA is positive is identified in FIGS. 22-30. Additionally, the lower and upper spark and torque boundary curves are plotted and identified.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. For example, while the implementation of a second order inverse torque model in the inverse APC module 428 and the inverse MAP module 430 are discussed, the second order torque model of the present disclosure may also be applied to the torque estimation module 324 to calculate the estimated torque. The same may also be varied in many ways. Such variations are not to be regarded as a departure from the invention, and all such modifications are intended to be included within the scope of the invention.

What is claimed is:

1. An engine control system comprising:
    a spark module that determines a bounded spark value based on a desired spark value;
    a torque module that determines a bounded torque value based on said bounded spark value and a desired torque value; and
    an inverse torque calculation module that determines a desired engine air value based on said bounded torque value and the square of said bounded spark value.

2. The engine control system of claim 1, wherein said desired engine air value is one of a desired APC and a desired MAP.

3. The engine control system of claim 1, wherein said inverse torque calculation module determines said desired engine air value based on the square root of a sum of a fourth power of said bounded spark value and said bounded torque value, and wherein said sum is greater than or equal to zero.

4. The engine control system of claim 1, wherein said inverse torque calculation module determines said desired engine air value using a second order torque equation defined as:

$$T=K_{A2}*A^2+K_A*A+K_{AS}*A*S+K_{AS2}*A*S^2+K_S*S+K_{S2}*S^2+K_R,$$

wherein A is equal to said desired engine air value, S is equal to said bounded spark value, T is equal to said bounded torque value, and $K_{A2}$, $K_A$, $K_{AS}$, $K_{AS2}$, $K_S$, $K_{S2}$, and $K_R$ are predetermined torque sensitivity constants that are based on an engine actuator position.

5. The engine control system of claim 4, wherein said bounded spark value is determined based on a number of spark poles, and wherein said number of spark poles are determined based on said torque sensitivity constants.

6. The engine control system of claim 4, wherein said bounded torque value is determined based on said torque sensitivity constant $K_{A2}$.

7. The engine control system of claim 4, wherein said desired engine air value is MAP and said torque sensitivity constant $K_{A2}$ is equal to zero.

8. The engine control system of claim 4, wherein said torque sensitivity constant $K_A$ is greater than zero.

9. The engine control system of claim 4, wherein said predetermined torque sensitivity constants are based on one from a group including a cam phaser angle, an air/fuel ratio, an oil temperature, a number of cylinders currently being fueled, a dual pulse mode, and an ethanol equivalence mode.

10. The engine control system of claim 4 further comprising a torque estimation module that determines an estimated engine torque using said second order torque equation, wherein A is equal to a measured engine air value and S is equal to said desired spark value.

11. The engine control system of claim 1 further comprising an inverse MAP module that determines a desired MAP value based on said bounded torque value and the square of said bounded spark value, wherein said inverse torque calculation module determines a desired APC value.

12. A method comprising:
    determining a bounded spark value based on a desired spark value;
    determining a bounded torque value based on said bounded spark value and a desired torque value; and
    determining a desired engine air value based on said bounded torque value and the square of said bounded spark value.

13. The method of claim 12, wherein said desired engine air value is one of a desired APC and a desired MAP.

14. The method of claim 12, wherein said determining said bounded spark value includes determining said bounded spark value based on a number of spark poles.

15. The method of claim 12, wherein said determining said desired engine air value includes determining the square root of a sum of a fourth power of said bounded spark value and said bounded torque value, wherein said sum is greater than or equal to zero.

16. The method of claim 12, wherein determining said desired engine air value includes determining said desired engine air value using a second order torque equation defined as:

$$T = K_{A2}*A^2 + K_A*A + K_{AS}*A*S + K_{AS2}*A*S^2 + K_S*S + K_{S2}*S^2 + K_R,$$

wherein A is equal to said desired engine air value, S is equal to said bounded spark value, T is equal to said bounded torque value, and $K_{A2}$, $K_A$, $K_{AS}$, $K_{AS2}$, $K_S$, $K_{S2}$, and $K_R$ are predetermined torque sensitivity constants that are based on an engine actuator position.

17. The method of claim 16 further comprising determining a number of spark poles based on said torque sensitivity constants, wherein determining said bounded spark value includes determining said bounded spark value based on said number of spark poles.

18. The method of claim 16, wherein said determining said bounded torque value includes determining said bounded torque value based on said torque sensitivity constant $K_{A2}$.

19. The method of claim 16, wherein said desired engine air value is MAP and said torque sensitivity constant $K_{A2}$ is equal to zero.

20. The method of claim 16, wherein said torque sensitivity constant $K_A$ is greater than zero.

21. The method of claim 16, wherein said engine actuator position is selected from a group including intake and exhaust cam phaser angles, an air/fuel ratio, an oil temperature, a number of cylinders currently being fueled, a dual pulse mode, and an ethanol equivalence mode.

22. The method of claim 16 further comprising determining an estimated engine torque using said second order torque equation, wherein A is equal to a measured engine air value and S is equal to said desired spark value.

23. The method of claim 12 further comprising determining a desired MAP value based on said bounded torque value and the square of said bounded spark value, and wherein said desired engine air value is a desired APC value.

* * * * *